(12) United States Patent
Hofmann

(10) Patent No.: US 9,334,987 B2
(45) Date of Patent: May 10, 2016

(54) PRESSING JAW, METHOD FOR PRODUCING A NON-DETACHABLE PIPE JOINT, FITTING AND SYSTEM CONSISTING OF A PRESSING JAW AND A FITTING

(71) Applicant: Viega GmbH & Co. KG, Attendorn (DE)

(72) Inventor: Frank Hofmann, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 0 days.

(21) Appl. No.: 14/410,452

(22) PCT Filed: Mar. 12, 2013

(86) PCT No.: PCT/EP2013/054996
§ 371 (c)(1),
(2) Date: Dec. 22, 2014

(87) PCT Pub. No.: WO2014/000897
PCT Pub. Date: Jan. 3, 2014

(65) Prior Publication Data
US 2015/0321238 A1    Nov. 12, 2015

(30) Foreign Application Priority Data

Jun. 28, 2012  (DE) .......................... 10 2012 105 655

(51) Int. Cl.
*B21D 39/04*  (2006.01)
*F16L 13/14*  (2006.01)
(Continued)

(52) U.S. Cl.
CPC ............. *F16L 13/141* (2013.01); *B21D 39/048* (2013.01); *B25B 27/10* (2013.01); *F16L 13/08* (2013.01); *F16L 21/002* (2013.01); *F16L 21/08* (2013.01); *Y10T 29/49908* (2015.01); *Y10T 29/49924* (2015.01); *Y10T 29/49925* (2015.01);
(Continued)

(58) Field of Classification Search
CPC ..... B21D 39/048; B25B 27/10; F16L 13/141; F16L 13/08; F16L 21/002; F16L 21/08; Y10T 29/49934; Y10T 29/49924; Y10T 29/49908; Y10T 29/5367; Y10T 29/53843; Y10T 29/49927; Y10T 29/49925; Y10T 29/53813; Y10T 29/49929
See application file for complete search history.

(56) References Cited

U.S. PATENT DOCUMENTS 3,375,026 A   3/1968   Szohatzky
4,089,453 A   5/1978   Jenkins
(Continued)

FOREIGN PATENT DOCUMENTS

DE    2332241 A1    1/1975
DE    10026083 C1   10/2001
(Continued)

*Primary Examiner* — John C Hong
(74) *Attorney, Agent, or Firm* — The Webb Law Firm

(57) ABSTRACT

A cheek plate for producing a non-detachable pipe joint having an upper cheek half and a lower cheek half, at least one swivel pin which pivotally mounts at least one cheek half, and a receiving region formed between the upper cheek half and the lower cheek half and having a receiving region axis, the at least one cheek half being able to pivot between an open position and a closed position substantially transversely with respect to the receiving region axis. The problem of providing a cheek plate, wherein the cheek plate permits pressing transverse to the receiving region axis and at the same time a reduction in workpiece size is permitted, is solved in that at least one pushing unit is provided, said pushing unit being displaceable at least partially in parallel with the receiving region axis.

15 Claims, 19 Drawing Sheets

(51) Int. Cl.
  *B25B 27/10* (2006.01)
  *F16L 13/08* (2006.01)
  *F16L 21/00* (2006.01)
  *F16L 21/08* (2006.01)

(52) U.S. Cl.
  CPC ...... *Y10T 29/49927* (2015.01); *Y10T 29/49929* (2015.01); *Y10T 29/49934* (2015.01); *Y10T 29/5367* (2015.01); *Y10T 29/53813* (2015.01); *Y10T 29/53843* (2015.01)

(56) References Cited

U.S. PATENT DOCUMENTS

| | | | |
|---|---|---|---|
| 4,956,904 | A | 9/1990 | Yamamoto et al. |
| 5,114,191 | A | 5/1992 | Sareshwala |
| 6,769,722 | B1 | 8/2004 | Krauleidis |
| 2004/0255444 | A1 | 12/2004 | Gerber |
| 2007/0281528 | A1 | 12/2007 | Bronnimann et al. |
| 2011/0016696 | A1 | 1/2011 | Hofmann et al. |

FOREIGN PATENT DOCUMENTS

| | | |
|---|---|---|
| DE | 10105013 C1 | 7/2002 |
| DE | 102004016305 A1 | 12/2004 |
| DE | 202004012774 U1 | 12/2004 |
| DE | 102008010083 A1 | 8/2009 |
| DE | 102009047779 A1 | 4/2011 |
| DE | 102010050320 B3 | 2/2012 |
| EP | 1293273 A2 | 3/2003 |
| EP | 1347226 A2 | 9/2003 |
| GB | 2440445 A | 1/2008 |
| JP | 5329849 | 8/1978 |
| JP | 569026 A | 1/1981 |
| JP | 10128561 A | 5/1998 |
| JP | 2003515706 A | 5/2003 |
| WO | 9620807 A1 | 7/1996 |
| WO | 2005068888 A1 | 7/2005 |

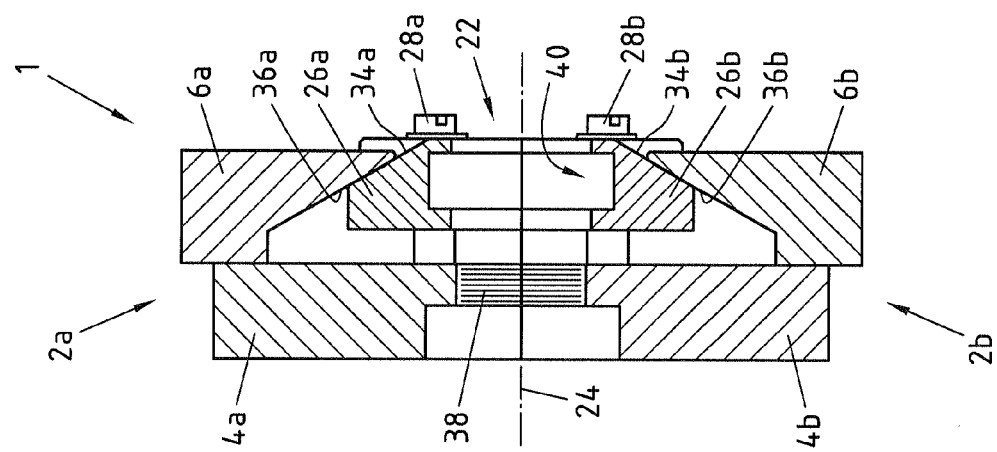
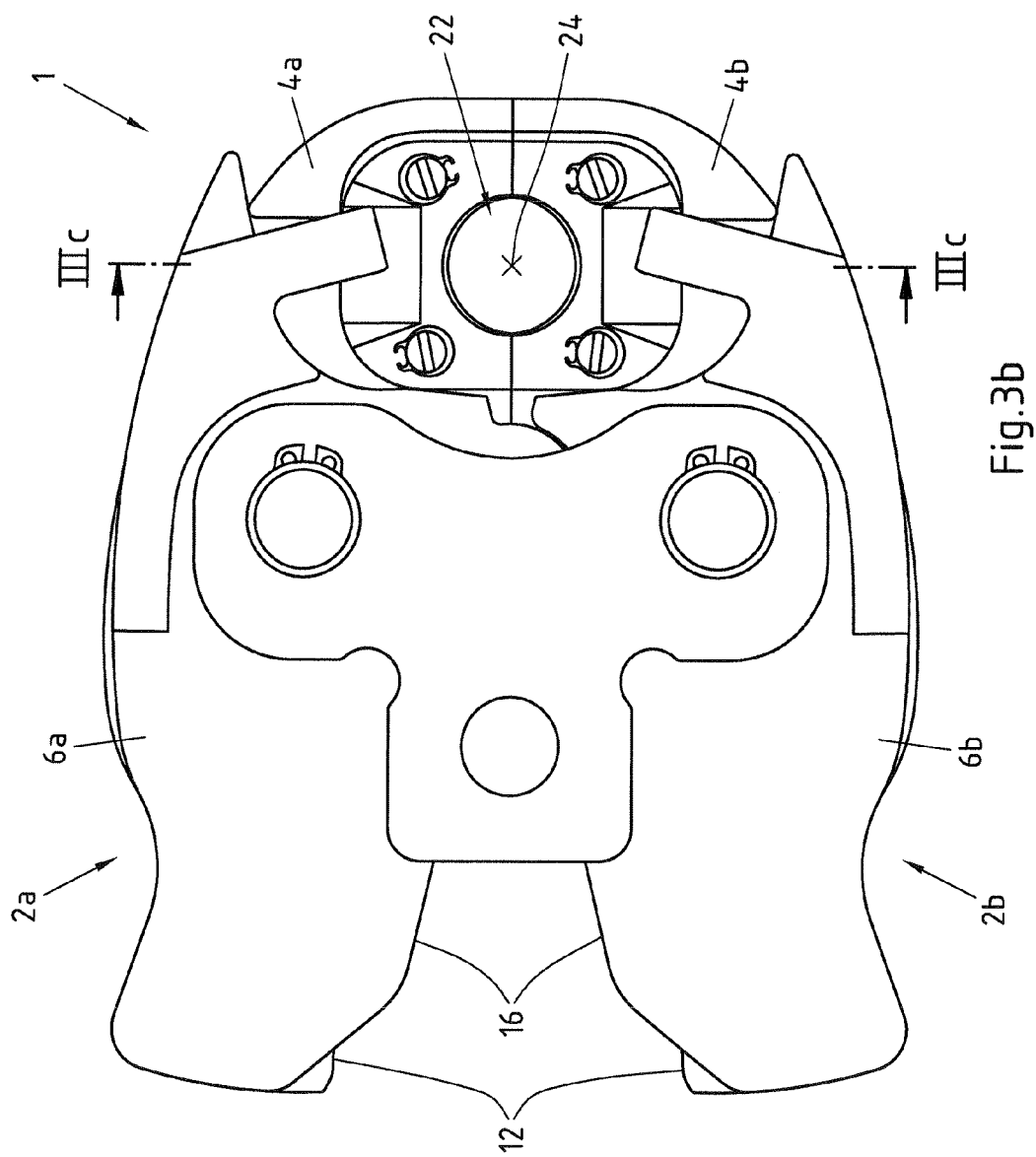

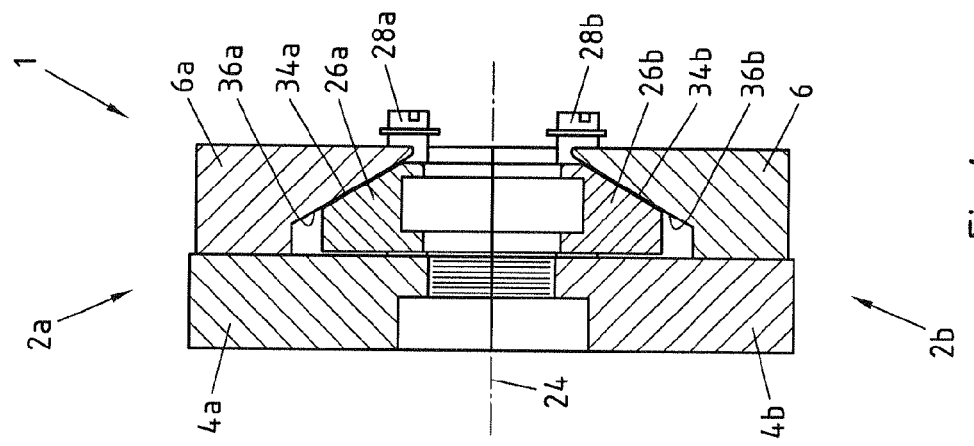
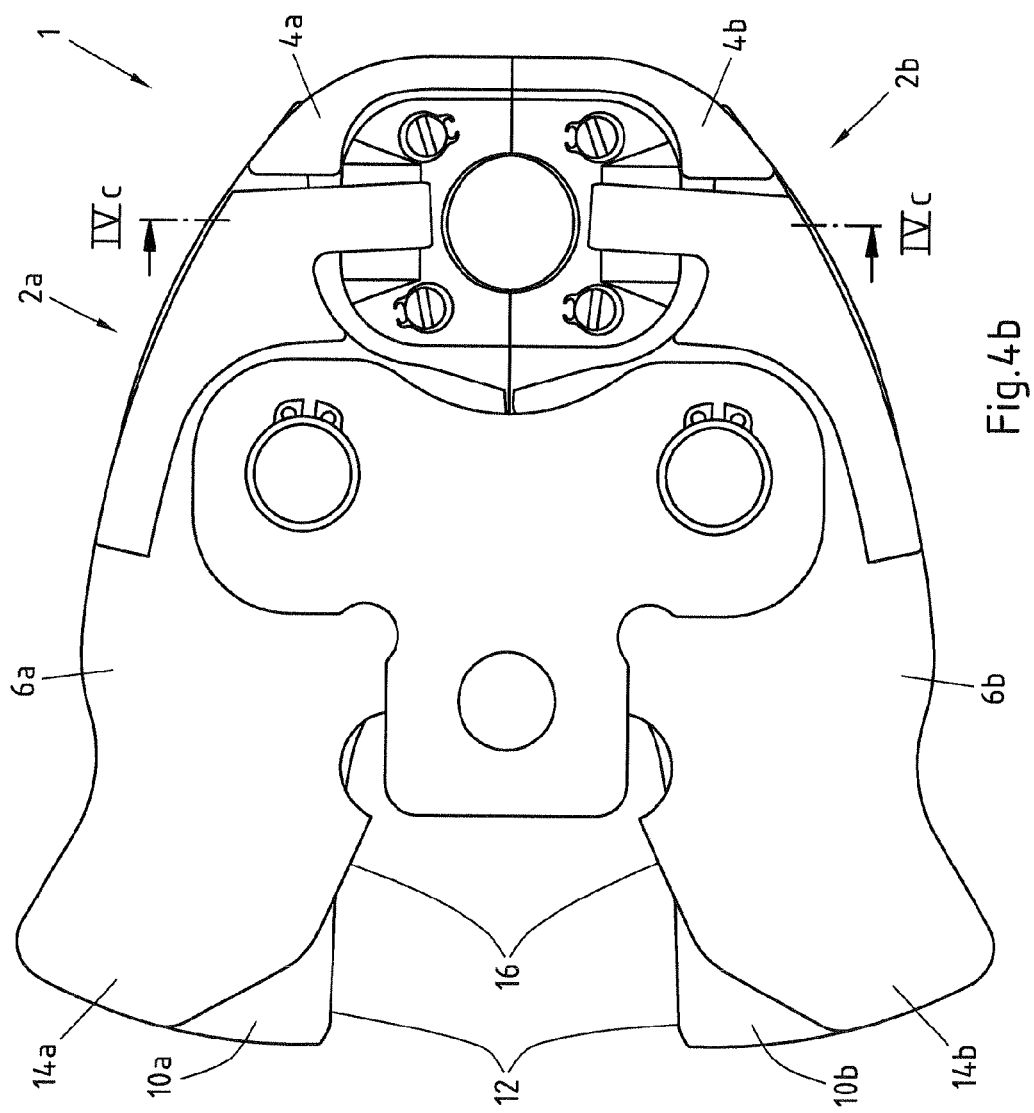

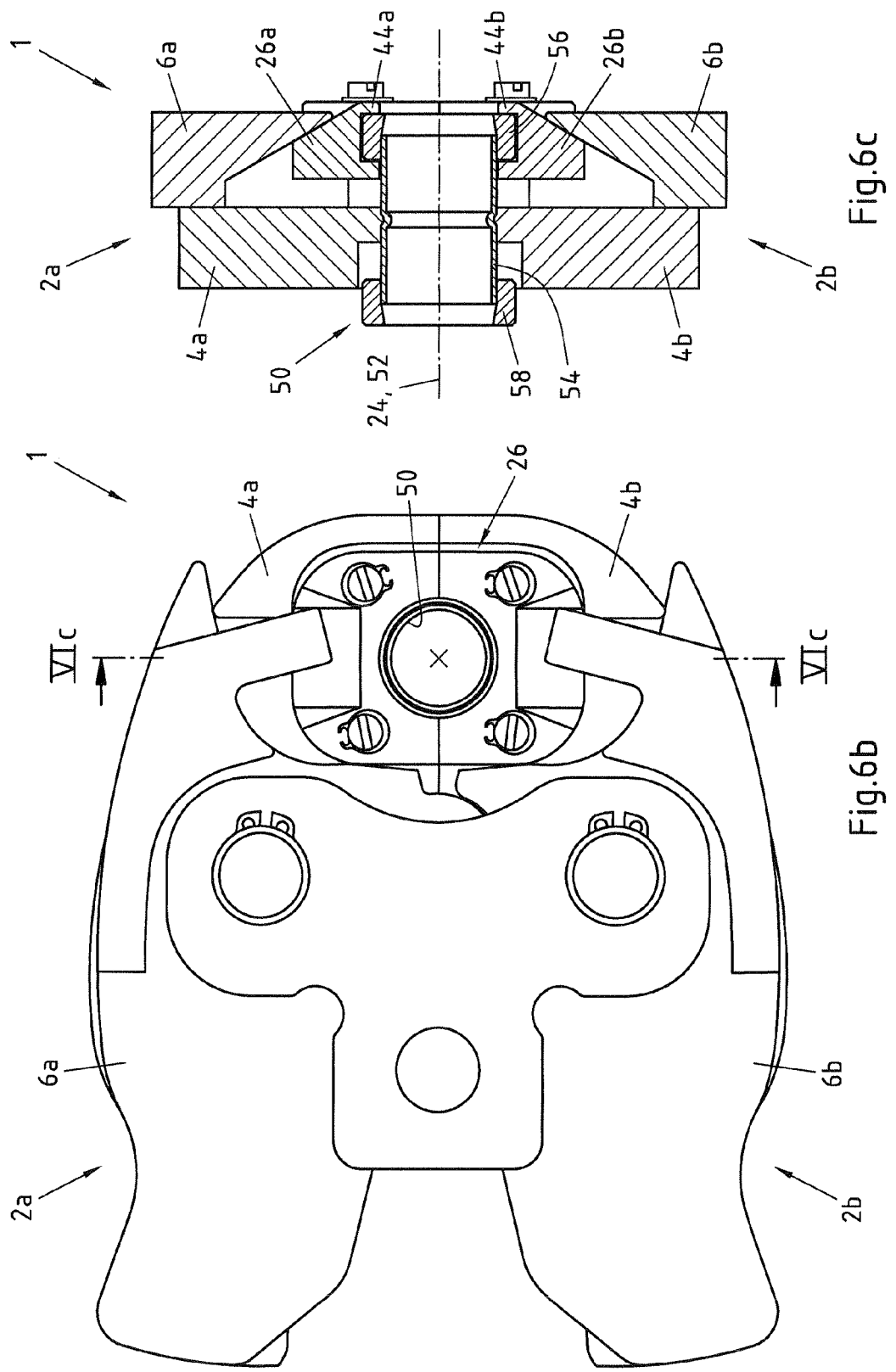

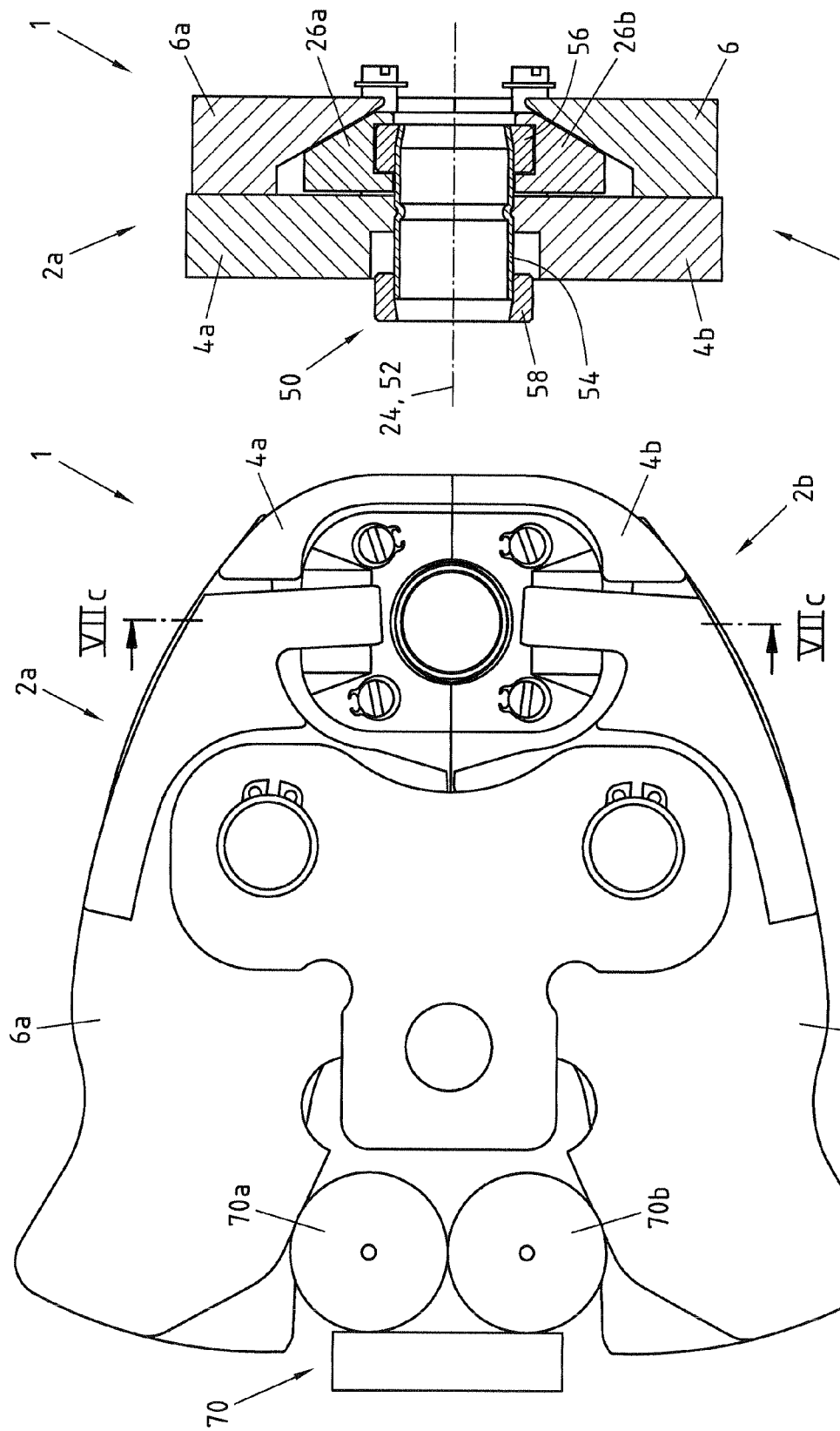

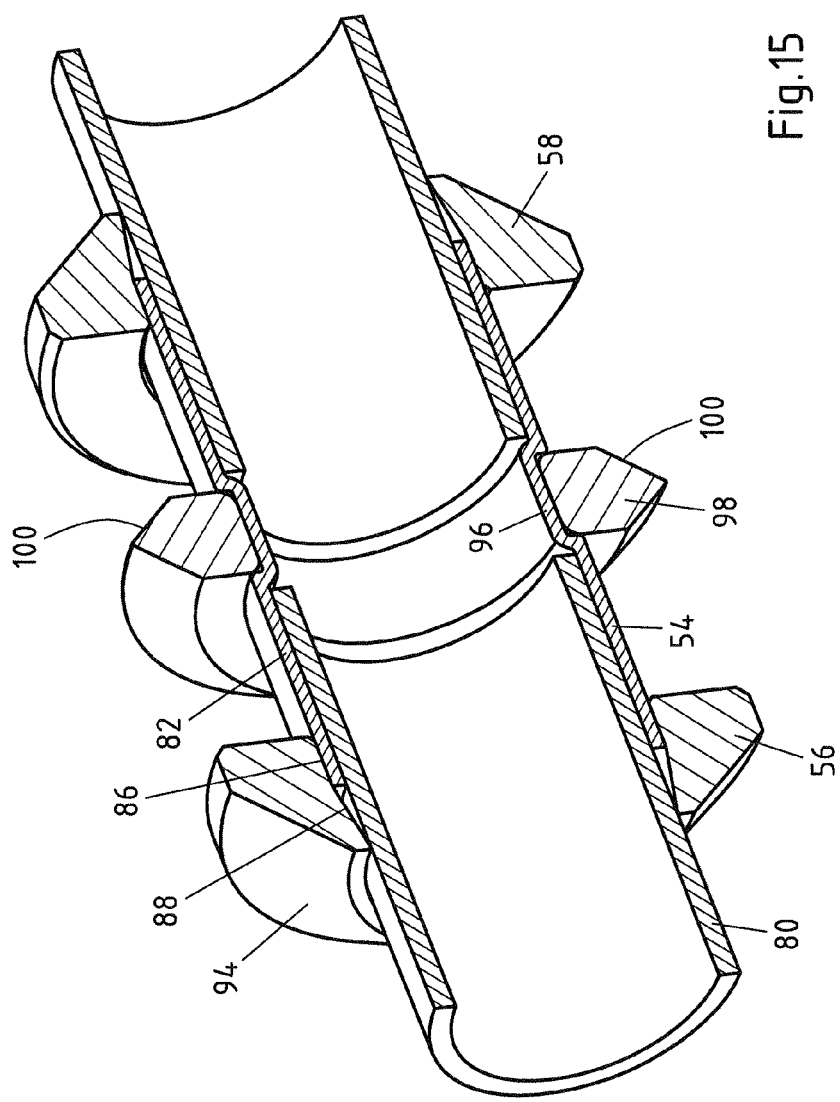

PRESSING JAW, METHOD FOR PRODUCING A NON-DETACHABLE PIPE JOINT, FITTING AND SYSTEM CONSISTING OF A PRESSING JAW AND A FITTING

CROSS-REFERENCE TO RELATED APPLICATIONS

This application is the United States national phase of International Application No. PCT/EP2013/054996 filed Mar. 12, 2013, and claims priority to German Patent Application No. 10 2012 105 655.2 filed Jun. 28, 2012, the disclosures of which are hereby incorporated in their entirety by reference.

BACKGROUND OF THE INVENTION

1. Field of the Invention

The invention relates to a pressing jaw for producing a non-detachable pipe joint having an upper jaw half and a lower jaw half, at least one rotation axis which pivotally mounts at least one jaw half, and a receiving region formed between the upper jaw half and the lower jaw half and having a receiving region axis, whereby the at least one jaw half is able to pivot between an open position and a closed position substantially transversely to the receiving region axis. The invention also relates to a fitting and to a system consisting of a pressing jaw according to the invention, wherein the fitting comprises a base body and a press sleeve. The invention further relates to a method for producing a non-detachable pipe joint using a pressing jaw and to a method for joining a fitting to a metallic pipe in a metallically sealing manner.

2. Description of Related Art

Pressing jaws, fittings, systems and methods of the type mentioned above are already known from the prior art, for example from the sectors of drinking water installation or heating installation. In this respect, a "non-detachable pipe joint" is understood in particular as meaning that the joint is not configured to be detached and reconnected, i.e. it can no longer be detached, or can only be detached with difficulty, in particular only by destroying the individual workpieces of the pipe joint.

It is intended that the pipe joint can be produced as simply and reliably as possible and will ensure a high degree of tightness for as long as possible. Pressing jaws or methods are preferably used to press workpieces such as fittings, pipes, sockets or the like substantially radially, i.e. transversely to the axis of the receiving region. In this respect, the receiving region axis extends approximately vertically to the area spanned between the jaw halves. In the case of a cylindrical receiving region, the axis of the receiving region substantially corresponds to the axis of the cylinder. When a workpiece is introduced into the receiving region, the receiving region axis and the workpiece axis of for example a pipe or fitting then substantially coincide, at least when the jaw halves are closed. The gripper-like closing movement of the jaw halves deforms two or more workpieces, for example a fitting and a pipe, which are arranged such that they at least partly overlap in the receiving region and as a result are joined together in a non-detachable manner.

For the closing movement of the pressing jaw, a pressing machine is often used, onto which the pressing jaw is fitted and which pushes a bolt or rollers between the rear ends of the jaw halves of the pressing jaw to close the front ends of the jaw halves forming the receiving region. As an alternative or in addition, for example a manual actuation of the pressing jaw can also be intended. The distinction into "upper" and "lower" (jaw half for example) should not be understood as being restrictive. In fact, the pressing jaw can be spatially arranged as required.

The prior art pressing procedures can, however, be disadvantageous. For example, the exertion of an all-round homogeneous pressing force on the workpieces to be pressed is made significantly more difficult using pressing jaws or methods provided for this purpose. Before the pressing procedure, pipes and fittings preferably have a rotationally-symmetrical and substantially round shape. However, after the pressing procedure, this symmetry can be disturbed due to pressing forces which act non-homogeneously on the juncture between pipe and fitting, which can impair the functionality of the joint in particular.

Furthermore, the materials, in particular plastics material or metal, of the workpieces which are stressed during the pressing procedure can exhibit inertia towards the pressing forces. This inertia, in the form of restoring forces, can mean that the material, deformed by the pressing procedure, strives to at least partly reproduce the initial state or the initial structure of the workpieces. This requires the user of a merely radially inwardly acting pressing method to increase the pressing forces to be exerted radially inwards for example, in order to obtain the desired pressing result. However, this represents a demand on the materials of the workpieces to be pressed which goes beyond the intended extent and thus is basically undesirable.

The previously mentioned problems can be resolved or at least reduced using a so-called axial pressing method in particular. Here, "axial" means that the workpieces to be pressed are moved at least partly along the workpiece axis or the receiving region axis. Although the restoring characteristics of the workpieces to be deformed also act in principle in the axial direction, the effects of an increased stress on the material due to the usually long axial extent of the workpieces compared to the radial extent can be minimised.

Pressing tools for an axial pressing of this type are, however, very large and bulky since they have to widely encompass the region to be axially pressed. For this reason, German published patent application DE 10 2008 010 083 A1, for example, discloses a method in which a pressing tool for radial pressing can also achieve an axial pressing along the receiving region axis by means of inclined pressing surfaces on the tool and on the fitting. A fitting can thus be pressed along the receiving region axis in spite of the movement of the jaw halves transversely to the receiving region axis.

However, to translate or deflect the pressing force, a particular path is required which is provided by the inclined surfaces on the outer peripheral surface of the fitting. In this respect, it is a problem that fittings are required which increase greatly in diameter, because the diameter of the fittings is increased due to the inclined pressing surfaces. On the one hand, this leads to larger and relatively unmanageable fittings and on the other hand, it also results in a greater consumption of material, i.e. in higher production costs of the fittings.

The previously described fittings which are to be pressed axially generally use a sealing element consisting of a flexible material, in particular an elastomer. Likewise, fittings having a seal between two metal workpieces, so-called metallically sealing fittings with axial pressing are known. Before pressing, these fittings to be axially pressed have radially inwardly projecting cutting edges or ribs which, during pressing, penetrate the material of the pipe to be joined and thereby produce the seal. Thus, the construction of the fittings is complex and costly to produce. Fittings of this type are known from U.S. Pat. No. 5,114,191, DE 100 26 083 C1 and DE 101 05 013 C1.

In addition, solder fittings of a very simple construction have been known for a long time. Solder fittings consist of a simple section of pipe, the internal diameter of which is generally the same as that of the section of pipe to be joined thereto. At least one end of the solder fitting is widened as a socket over a predetermined receiving portion to such an extent that the internal diameter substantially corresponds to the external diameter of the pipe to be joined. The pipe to be joined is then inserted into the widened portion, i.e. into the socket and the fitting and the section of pipe are joined in a material-uniting manner by solder.

For this reason, solder fittings enjoy a wide spectrum of use and are an economical alternative to press fittings due to their low production costs. Although they are considered to be metallically sealing due to the solder, solder fittings do not have a material purity because of the different metals of pipe and solder. Furthermore, the fittings have to be soldered on site in a laborious manner which, on the one hand is very time-consuming and on the other hand, subject to the surroundings, is not permitted. Thus, for diverse technical applications, no press fitting exists which is metallically-sealing, but nevertheless comparable in economic terms.

SUMMARY OF THE INVENTION

In view of this, the object of the present invention is to provide a pressing jaw, a system using a pressing jaw, a method and a fitting, the pressing jaw easily allowing a pressing transversely to the axis of the receiving region and at the same time allowing a reduction in the size of the workpieces, particularly in the size of the fitting.

According to a first teaching of the invention, the technical problem is solved by a generic pressing jaw for producing a non-detachable pipe joint in that at least one pushing unit is provided, said pushing unit being displaceable at least partly parallel to the receiving region axis.

Due to the fact that the pressing jaw has at least one pushing unit which can be displaced at least partly parallel to the receiving region axis, with a generic pressing jaw it is easily achieved to allow a pressing procedure of the inserted workpiece or workpieces along the receiving region axis, in spite of a pivoting movement transversely to the receiving region axis. Hereby, the pushing unit allows the pressing procedure parallel to the receiving region axis. Here, it is unnecessary to provide high extending slide surfaces to deflect the force at the fitting, increasing the diameter of the fitting. Instead, the fitting can be configured with a small diameter, thereby providing a space-saving fitting which is advantageous to produce due to the saving of material. A workpiece, for example a fitting or a fitting component, can be moved directly by the at least partly parallel movement of the pushing unit parallel to the receiving region axis and relative to at least one jaw half, without having to provide a force deflection by means of slide surfaces on the fitting. Consequently it is also possible to provide a pressing jaw which is easier to handle compared to axial pressing machines of the prior art. The pressing jaw can also be used for pressing workpieces other than fittings.

The expression "displacement at least partly parallel to the receiving region axis" is understood as meaning that the pushing unit can also move in this direction only in portions and/or only temporarily. In addition, the pushing unit can perform, for example, a movement at the same time parallel and transverse to the receiving region axis, so that at least one component of the movement is parallel to the receiving region axis.

As a result, the pushing unit also thereby moves in particular at least partly parallel to the workpiece axis which is parallel to or coincides with the receiving region axis. It is preferable for the pushing unit to be substantially linearly displaceable.

The at least one rotation axis for mounting the at least one jaw half (preferably both jaw halves) can preferably be realised using a mount which can provide the at least one rotation axis. In this respect, the lower jaw half can also be mounted by a rotation axis which is separate from the rotation axis which mounts the upper jaw half. In this respect, the rotation axes are, however, preferably arranged substantially parallel.

Since the at least one jaw half can be pivoted about the at least one rotation axis substantially transversely to the receiving region axis, the receiving region axis and the at least one rotation axis are substantially parallel.

The workpiece to be pressed is preferably a fitting which preferably consists of a base body and a press sleeve which can be pushed onto the base body. A section of pipe can then be introduced into the fitting base body, for example. By pushing the press sleeve onto the fitting base body and/or onto the pipe, a pressing procedure is then carried out parallel to the receiving region axis, i.e. an axial pressing procedure is carried out. A homogeneous, radially inwardly force is exerted on the fitting base body and/or section of pipe by the press sleeve.

According to a configuration of the pressing jaw according to the invention, the upper jaw half has a first upper jaw quarter and a second upper jaw quarter and the lower jaw half has a first lower jaw quarter and a second lower jaw quarter. In this respect, the first jaw quarters can be closed at least partly independently of the second jaw quarters. In other words, the first jaw quarters form a pair of jaws which consists of mutually opposite first lower and upper jaw quarters, while the second jaw quarters form a pair of jaws which consists of mutually opposite second lower and upper jaw quarters. However, the jaw quarters can also be mounted by at least one common rotation axis. The upper jaw quarters, however, are preferably mounted by one rotation axis, while the lower jaw quarters are mounted by a further rotation axis. The upper jaw half is preferably constructed mirror-symmetrically to the lower jaw half, and thus the upper jaw quarters are constructed mirror-symmetrically to the respective lower jaw quarters.

The provision of jaw quarters makes it possible to realise an application-specific pressing, i.e. the pressing can be configured differently in terms of timing and/or space, for example. Thus, the second jaw quarters can be closed timewise after the first jaw quarters, for example. The first and second jaw quarters can also be provided with different functions by an appropriate configuration thereof. It is also possible to provide more than four jaw parts.

According to a particularly preferred configuration of the pressing jaw, a coupling is provided between the pushing unit and at least one second jaw quarter, specifically such that the displacement of the pushing unit at least partly parallel to the receiving region axis is at least partly coupled with the closing movement of the at least one second jaw quarter, which takes place substantially transversely to the receiving region axis.

In this way, the displacement of the pushing unit can be realised in a particularly simple manner and can be integrated into the closing movement of the pressing jaw. Thus, no additional actuation, for example external actuation of the pushing unit is required. Furthermore, pressing machines which are already available and are configured for radial pressing can also be used for axial pressing. A coupling can be achieved, for example, by a mechanical force deflection, so that the pivoting movement of the at least one second jaw quarter, which takes place substantially transversely to the receiving region axis or transversely to the at least one rotation axis, causes a displacement of the pushing unit at least partly parallel to the receiving region axis. In this respect, the coupling can take place, for example via contact surfaces, joints and/or by pneumatic means, to list a non-exhaustive number of examples. Due to the coupling, the pushing unit and the at least one first jaw quarter do not have to be of an integral construction. The pushing unit is preferably coupled with the second upper jaw quarter and with the second lower jaw quarter.

The fact that the pushing unit and the at least one second jaw quarter are at least partly coupled means that a coupling can only take place, for example, during the closing movement of the at least one second jaw quarter or also only partly during the closing movement. Therefore, the coupling can be limited time-wise during the pressing procedure. Thus for example, a closing movement of the at least one second jaw quarter can take place without a displacement of the pushing unit parallel to the receiving region axis taking place.

Advantageously, the pushing unit is displaced at least partly parallel to the receiving region axis only when the second upper jaw quarter moves relative to the first upper jaw quarter (if a coupling is provided between the pushing unit and the upper first jaw quarter) or when the second lower jaw quarter moves relative to the first lower jaw quarter (if a coupling is provided between the pushing unit and the lower first jaw quarter).

According to an advantageous configuration of the pressing jaw, the coupling is realised by contact surfaces which are provided on the pushing unit and on at least one second jaw quarter, are adapted to one another and are inclined relative to the receiving region axis. Consequently, the coupling can be realised in a particularly simple and cost-effective manner. Furthermore, the translation from the closing movement of the corresponding jaw quarter substantially transversely to the receiving region axis to the displacement of the pushing unit can be adjusted by the inclination of the contact surfaces.

The mutually adapted contact surfaces are preferably in contact with one another during an entire pressing procedure, i.e. when the second jaw quarters are open and also when the second jaw quarters are closed, in order to achieve an efficient transmission of force. The contact surfaces can advantageously be configured such that they promote sliding.

It has been found that when the contact surfaces are inclined relative to the receiving region axis by at least 30°, preferably by at least 40°, and particularly preferably by at least 45° and/or by a maximum of 80°, preferably by a maximum of 70°, particularly preferably by a maximum of 60°, it is possible to achieve a particularly efficient transmission of force simultaneously with a small-sized pressing jaw.

In this respect, the preferred inclination angle of the contact surfaces can vary subject to the workpieces to be pressed, in particular subject to the nominal width of the pipes to be pressed. If the inclination angle is restricted upwards, it is possible to ensure an adequate movement of the pushing unit parallel to the receiving region axis, i.e. an adequate stroke, during axial pressing. If the inclination angle is restricted downwards, it is possible to achieve an adequate transmission of force. Furthermore, in the case of greater inclination angles, a more compact construction of the pressing jaw can be achieved.

According to a further configuration of the pressing jaw according to the invention, the second jaw quarters are arranged offset relative to the first jaw quarters along the receiving region axis. This axial offset makes it particularly easy to configure the pressing by the first jaw quarters and/or by the second jaw quarters such that they differ in terms of time and/or location, for example.

In this respect, it is advantageous if the first jaw quarters are positioned substantially in a first plane substantially transversely to the receiving region axis and if the second jaw quarters are positioned substantially in a second plane substantially transversely to the receiving region axis. In other words, the first and second jaw quarters are located in each case in a radial plane of the receiving region axis. In this manner, in particular the receiving region formed between the upper jaw half and the lower jaw half can be substantially divided into two sub-regions, and in the first sub-region, the first jaw quarters can act on the workpiece to be inserted, for example via an inner contour, and in the second sub-region, the second jaw quarters can influence the workpiece to be inserted, for example via the pushing unit.

In this respect, the concept of the plane is to be interpreted widely, since the jaw quarters not least have a finite extent in the axial direction, i.e. in the direction of the receiving region axis. In this respect, within the meaning of this configuration, the jaw quarters located in different planes can also partly overlap and/or engage in one another in the direction of the receiving region axis. However, in the region of the at least one rotation axis and/or in the region of optionally provided inlet contours at the rear end of the jaw quarters, the first and second jaw quarters preferably do not overlap in the direction of the receiving region axis.

If the first jaw quarters are configured as clamping jaws, one or more workpieces can be fixed relative to the first jaw quarters. The clamping jaws can fix the workpiece or workpieces particularly in the direction of the receiving region axis, i.e. in the axial direction. The base body of a fitting or a section of pipe, for example, can be clamped thus. In this respect, the clamping can be achieved both by friction locking and by positive form locking. Likewise, the clamped workpiece or workpieces can be deformed. As a result of the fixing procedure, a particularly simple and effective pressing in particular can be achieved by the pushing unit. For example, the workpiece or workpieces to be pressed do not have to be held in position in the direction of the receiving region axis by an external force while the pushing unit carries out the pressing procedure in the direction of the receiving region axis.

For this purpose, the first jaw quarters configured as clamping jaws can have in particular an inner contour which is configured as a clamping profile and define at least part of the receiving region. This contour is in particular substantially cylindrical and can have for example a ribbing or a specific profile for fixing the inserted workpiece.

The first jaw halves are configured in particular such that a closing movement of said first jaw quarters substantially transversely to the receiving region axis produces a force substantially transverse to the receiving region axis, i.e. substantially in an inwardly radial direction.

In particular in this context, it is particularly preferred if the jaw quarters are configured such that the closing movement of the first jaw quarters takes place time-wise before the displacement of the pushing unit at least partly parallel to the receiving region axis. This ensures, for example, that a fitting base body is appropriately fixed before a press sleeve, for example, is pushed on by the pushing unit.

A further configuration of the pressing jaw according to the invention is characterised in that the first jaw quarters have a first inlet geometry and the second jaw quarters have a second inlet geometry, the first inlet geometry and the second inlet geometry being configured differently. In this way, a temporally adapted movement, in particular the closing movement of the first and second jaw quarters can be achieved in a particularly simple manner. Thus, for example, a partial or complete closing movement of the first jaw quarters can initially be provided before the second jaw quarters perform a closing movement.

However, it is particularly preferred if the first jaw quarters are at least fully closed before the second jaw quarters are fully closed. As a result, the displacement of the pushing unit at least partly parallel to the receiving region axis can be offset time-wise to the closing movement of the first jaw quarters. Consequently, for example an inserted workpiece can initially be clamped or pressed, followed thereafter by a displacement, at least partly parallel to the receiving region axis, of a further workpiece or of another part of the workpiece by the pushing unit.

If guide means are provided between the pushing unit and at least one first jaw quarter so that the movement of the pushing unit substantially transversely to the receiving region axis is coupled with the movement of the corresponding at least one first jaw quarter, the pushing unit can be applied to the workpiece or workpieces to be displaced together with the closing movement of the first jaw quarters. The guide means are provided particularly in the form of rails and guide bolts which run substantially parallel to the receiving region axis and on which the pushing unit can perform a movement parallel to the receiving region axis. Thus, particularly when the first jaw quarters are closed, the pushing unit can undergo a displacement which is at least partly parallel to the receiving region axis. The guide means can also prevent the pushing unit from deviating from a path which the guide means are providing.

Whereas the movement of the pushing unit transversely to the receiving region axis is then determined by the first jaw quarters, the displacement of the pushing unit substantially parallel to the receiving region axis is then preferably determined by the second jaw quarters.

It is possible to provide the guide means to be spring-loaded, so that for example the pushing unit is automatically returned into the starting position after the pressing procedure parallel to the receiving region axis.

The pushing unit is preferably pushed towards the first jaw quarters, in particular it is at least partly pushed into a receptable in the first jaw quarters. In this manner, it is possible to provide a particularly space-saving pressing jaw.

According to an advantageous configuration, the pressing jaw is characterised in that the pushing unit has an upper pushing element and a lower pushing element. The lower pushing element can thus be associated with the lower jaw half and the upper pushing element can be associated with the upper jaw half. In this manner, a homogeneous force can also be exerted on the workpiece, for example on a press sleeve, which is to be displaced parallel to the receiving region axis. It is also possible to provide a pushing unit which has more than two pushing elements.

According to a second teaching of the invention, the object is achieved by a system consisting of a pressing jaw according to the invention and a fitting having a base body and a press sleeve, wherein the receiving region of the pressing jaw is adapted to the base body of the fitting and wherein the pushing unit of the pressing jaw is adapted to the press sleeve, so that the press sleeve can be at least partly pushed onto the fitting base body by the movement of the pushing unit at least partly parallel to the receiving region axis.

Due to the provision of a pushing unit which is adapted to the press sleeve, it being possible for the press sleeve to be at least partly pushed onto the fitting base body by the movement of the pushing unit at least partly parallel to the receiving region axis, in a simple manner a system is provided, wherein a pressing procedure can be carried out in the direction of the receiving region axis or of the fitting axis. Here, the axis of the press sleeve, the axis of the fitting base body and the receiving region axis preferably coincide, at least when the pressing jaw is closed.

In this respect, the pushing unit facilitates the pushing of the press sleeve onto the fitting base body. The press sleeve does not have to be directly pushed onto the fitting base body. It is also possible for further fitting components or sections of pipe to be provided inbetween.

As a result, high extending slide surfaces on the fitting which increase the diameter of the fitting do not have to be provided. Instead, the fitting, in particular the press sleeve can be configured with a small diameter, thereby making it possible to provide a space-saving fitting which is advantageous to produce due to the saving of material. Furthermore, a system can be provided which is easier to handle compared to the prior art systems.

The pushing unit can be adapted, for example, by radial inward projections on the inner contour of the pushing unit which can engage behind the press sleeve and/or can engage in corresponding recesses. As an alternative or in addition, radially outwardly engaging projections can also be provided on the press sleeve, which projections correspond to the pushing unit.

The pressing jaw is adapted to the base body of the fitting in particular by an adaption of the first jaw quarters which preferably fix the base body of the fitting.

With regard to further configurations and advantages of the system according to the invention, reference is made to the subclaims and to the description of the pressing jaw according to the invention.

According to a third teaching of the invention, the object is achieved by a method for producing a non-detachable pipe joint using a pressing jaw, in particular using a pressing jaw according to the invention, wherein a fitting base body located in a receiving region of the pressing jaw is fixed by actuating the pressing jaw, wherein after the fitting base body has been fixed, the press sleeve is pushed onto the fitting base body by a movement of a pushing unit of the pressing jaw, which movement is at least partly parallel to the receiving region axis.

The method according to the invention allows an axial pressing in a simple manner and, at the same time, a reduction in size of the fitting. The fixing of the fitting base body and the movement of the pushing unit at least partly parallel to the receiving region axis produces an axial pressing, without having to use high extending fittings or massive axial pressing machines.

The section of pipe is advantageously fixed by a first upper and a first lower quarter of the pressing jaw and the movement of the pushing unit, which is at least partly parallel to the receiving region axis, is produced by a closing movement of a second lower and a second upper quarter of the pressing jaw. These measures provide a particularly reliable method which is simple to carry out and allow the use of a particularly compact pressing jaw.

As set out in more detail below, the previously described method is particularly suited to the production of a metallically sealing joint between a fitting and a section of pipe. According to a fourth teaching of the present invention, the object set out above is achieved by a fitting for a metallically sealing joint with at least one metallic pipe, having a metal fitting base body and a press sleeve, preferably in the form of a press ring, the fitting base body having a cylindrical socket with an internal diameter adapted to the external diameter of the pipe to be joined, the press sleeve having at one end a receiving portion for receiving an end part of the socket, the press sleeve having a pressing portion, the inner profile of which tapers in the axial direction to a diameter smaller than the external diameter of the fitting base body, and in a starting position, the fitting base body is partly inserted into the press sleeve and the inner profile of the pressing portion is capable of tapering the edge of the socket to an internal diameter which is smaller than the external diameter of the pipe to be joined, during an axial displacement onto the fitting base body.

During the pressing procedure, in the case of the fitting according to the invention, the preferably smooth and burr-free edge of the cylindrical socket of the fitting base body is deformed or flanged radially inwards. This produces a so-called sealing flange. Thus, as a result of the pressing procedure, the entire periphery of the edge of the cylindrical socket becomes a cutting edge. A cutting edge or cutting rib provided before pressing is thus not required.

Within the context of the present invention, the term "cylinder" or "cylindrical" is understood as meaning a straight cylinder, cylinders having an area other than a circular shape also being included, in addition to the most frequently occurring circular cylinders. The invention is therefore not restricted to circular-cylindrical fitting base bodies and pipes.

The described fitting can thus be produced very economically, since only components of the simplest geometry are required. The installation space for a fitting is minimised thereby, as a result of which in particular the expense of heat insulation after installation can be reduced.

In addition, if the pipe and the fitting base body consist of the same material, it is possible to produce a joint made of a single material by pressing. Therefore, the described fitting has a wide field of application, because only the material of the fitting restricts the use. In this respect, copper, stainless steel, galvanised steel, red bronze as well as suitable plastics materials for example, are possible as materials.

The press sleeve of the described fitting is preferably pushed onto the base body of the fitting such that thereafter, the press sleeve remains on the fitting base body by self-retention without further aids. For this purpose, the internal diameter of the inner profile of the receiving portion can be configured such that a light press fit with the fitting base body is produced. For this purpose, either the internal diameter can be fully adapted or the inner surface can be roughened. The press sleeve can thereby be rigidly connected to the fitting base body in the factory, thereby avoiding connection on site.

The receiving portion is preferably cylindrical, so that the socket of the fitting base body is received along the cylindrical receiving portion and retained thereon.

It is also possible to configure the receiving portion of the press sleeve such that it tapers, in particular with a conically extending inner profile at a shallow angle. In this case, the cross section of the opening at the receiving portion of the press sleeve is greater than the external diameter of the socket of the fitting base body, which facilitates insertion. During insertion, the socket is then guided into the receiving portion until the press sleeve rests firmly on the socket due to the tapering cross section of the receiving portion.

In a further preferred manner, the pressing portion has a conical, round or bulging inner profile. In any case, the inner profile ensures that when the press sleeve is pushed on, the edge of the socket is forced radially inwards and is thereby flanged. In this respect, the configuration as a conically deflecting inner profile is preferred, because this ensures a uniform and continuously performed flanging. However, if the inner contour is round or bulging, then while the press sleeve is being pushed on, the inward gradient increases, so that a greater flanging can be achieved with a shorter displacement path. Furthermore, in this case, the angle at which the edge of the socket cuts into the material of the pipe is steeper.

In a further preferred manner, the angle of the pressing portion to the axial alignment of the press sleeve and thus to the pipe itself is approximately 1 to 30°, preferably 10 to 20°. The angle is adapted in each case to the material which is used and to the proportions in size of the fitting base body to be formed and of the pipe wall.

The press sleeve consists of a material which is harder than the material of the fitting base body. In particular, the material preferably consists of a metal, for example copper, stainless steel, galvanised steel and red bronze. Suitable plastics materials are also possible. The surface of the pressing portion preferably consists of the same material as the press sleeve.

In order to form the socket of the fitting base body in a uniform manner, it is preferable for the surface of the pressing portion to be hardened to ensure that the socket does not cut into the material of the press sleeve, but assuredly cuts into the material of the pipe, in particular of the metal pipe. When multilayer pipes are used, the outer layer usually consists of a plastics material and a layer arranged in the centre of the composite structure consists of a metal. In this case, a reshaping is necessary inasmuch as a permanent seal is produced by the reshaping of the fitting base body. For this purpose, it may be necessary for the fitting base body to be flanged to such an extent that the inner metal layer is also at least partly formed.

If, as mentioned above, the inner profile of the receiving portion tapers, the receiving portion and the pressing portion can extend in a uniform inner contour and, for example, can have an identical gradient, at least in the transition region between the two portions. Thus, the receiving portion and the pressing portion could not be differentiated from one another by a change of the inner contour and could only be distinguished from one another by their respective functions. In particular, the press sleeve can have an inner taper which forms the receiving portion in the region of the opening and forms the pressing portion adjoining inwardly therewith.

The previously described fitting consisting of base body and press sleeve is suitable for all types of axial pushing tools. During pressing, the only significant factor is that the press sleeve is pushed axially onto the socket of the base body of the fitting. The axial movement peripherally ensures a uniform flanging of the edge and thereby a uniform pressing result.

In particular, the fitting can be pressed by a previously described pressing jaw with a pushing unit. For this purpose, the fitting base body preferably has a clamping portion for clamping by means of a first jaw pair of the pressing jaw. Clamping can be performed with a force that the clamping portion is only deformed within the elastic range and after the pressing jaw has been released, it returns into the starting position.

However, the clamping action can also result in partial pressing in the region of the clamping portion, it being possible for the reshaping to take place rotationally symmetrically or also in the form of a polygon, in particular a hexagon to prevent the pipe from twisting relative to the fitting base body. This reshaping increases the mechanical strength of the joint, but does not serve to form in a sealing manner.

Furthermore, a pressing procedure using a pressing jaw according to DE 10 2008 010 083 A1 is also possible. This type of pressing jaw has a pair of jaws which has an oblique contour on both sides of the pressing profile. Upon compression of the pressing jaw, two engagement surfaces, deflecting at an oblique angle relative to one another, are moved towards one another, thereby allowing an axial pressing. For this purpose, the press sleeve has an obliquely deflecting bearing surface and the fitting base body has a clamping ring, preferably arranged in a circumferential depression, with a bearing surface extending in the opposite direction.

In a further preferred manner, provided in the fitting base body is a portion which adjoins the socket and has a smaller diameter and serves as a stop in a known manner. Thus, the pipe to be joined can be inserted into the fitting as far as this stop, so that a satisfactory guidance of the pipe through the fitting before pressing is ensured.

A further advantage of the described fitting is that when it is not pressed, it is not tight. In the not yet pressed joint between the socket of the fitting base body and the pipe, no flexible sealing material can produce an undesired sealing. Thus, when a mounted line with the fitting according to the invention is tested under pressure, an unpressed fitting is not tight. Only upon completion of axial pressing a seal is produced.

The fittings described above are distinguished by a simple shape which, precisely because of this simplicity, provides a surprisingly good pressing result for a metallically sealing joint between a fitting and a pipe. For this reason, a solder fitting known per se can be used as the fitting base body. Only the press sleeve has to be additionally provided in order to join the solder fitting in a fixed and metallically sealing manner to an inserted pipe without soldering by axially pushing on the press sleeve.

The fittings according to the invention can be used in a virtually unrestricted manner. On one hand, the fittings can replace known solutions with an economical solution, thus for example in the sectors of drinking water pipe installation and heating pipe installation. On the other hand, metallically sealing fittings which are to be pressed axially based on the present invention can also be used for the first time in the following fields of application: refrigeration plants, industrial plants, in particular natural gas pipelines, crude oil pipelines and petrol pipelines as well as chemical industry plants, solar plants, installation plants for conducting medical gases or also in the aerospace industry.

According to a fifth teaching of the invention, the object set out above is achieved by a method for joining a fitting to a metallic pipe in a metallically sealing manner, in which method a press sleeve having a receiving portion is arranged on a cylindrical socket of a fitting base body, a pipe is inserted into the cylindrical socket, the press sleeve is pushed axially onto the socket by a pressing jaw, the edge of the socket is deformed radially inwards by a tapering pressing portion configured inside the press sleeve, and the edge of the socket is pressed into the material of the pipe as a cutting edge.

Thus, the method according to the invention can be implemented irrespective of the specific configuration of the pressing jaw. All that is required is that the pressing jaw and the elements of the fittings necessary for the transmission of force are adapted to one another.

With regard to further configurations and advantages of the method according to the invention, the pressing jaw according to the invention, the system according to the invention and the fitting according to the invention, reference is made to the respective subclaims and to the following description.

BRIEF DESCRIPTION OF THE DRAWINGS

In the following, the invention will be described in more detail with reference to an embodiment illustrated in the drawings, in which:

FIG. 3a-c are different views of the pressing jaw from FIG. 2 with closed first jaw quarters, FIG. 4a-c are different views of the pressing jaw from FIG. 3 with additionally closed second jaw quarters, FIG. 6a-c are different views of the pressing jaw and the fitting from FIG. 5 with a fully inserted fitting and closed first jaw quarters, FIG. 7a-c are different views of the pressing jaw with fitting from FIG. 6 with closed second jaw quarters, FIG. 15 is a perspective view of a third embodiment of a fitting according to the invention before pressing.

DETAILED DESCRIPTION OF THE INVENTION

In the following, a pressing jaw 1, a system and a method according to the present invention will be described by way of example with reference to FIGS. 1 to 7. FIGS. 8 to 18 show embodiments of fittings according to the invention.

Figure 1:
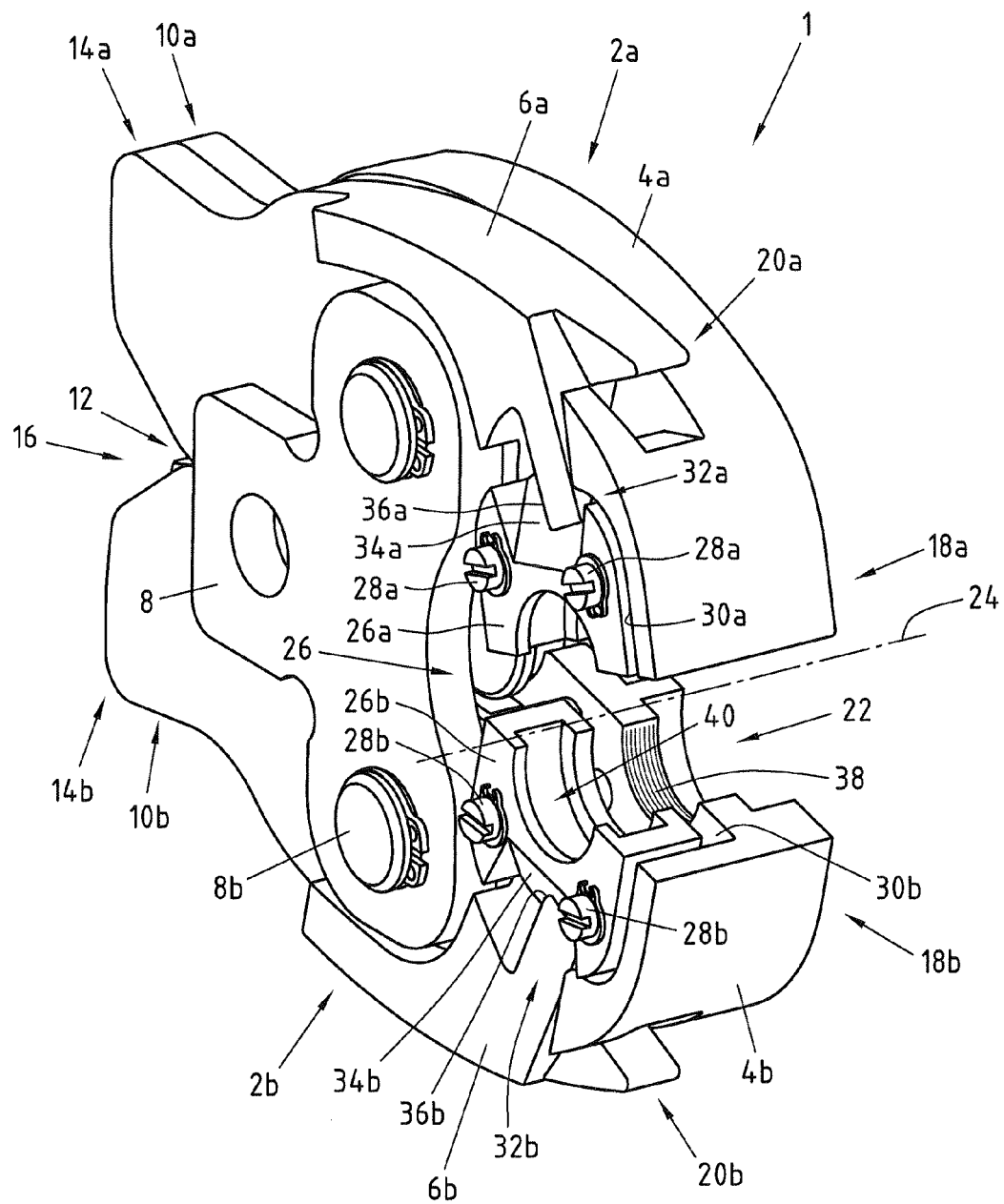
FIG. 1 is a perspective view of an embodiment of a pressing jaw with open jaw halves.

FIG. 1 is a perspective view of an embodiment of a pressing jaw 1 with open jaw halves 2a, 2b. The upper jaw half 2a of the pressing jaw 1 consists of a first upper jaw quarter 4a and a second upper jaw quarter 6a. The lower jaw half 2b consists of a first lower jaw quarter 4b and a second lower jaw quarter 6b. In FIG. 1, the pressing jaw 1 is shown with open jaw halves 2a, 2b, i.e. both the first jaw quarters 4a, 4b and the second jaw quarters 6a, 6b are in a fully open position. The mount 8 has an upper rotation axis 8a which pivotally mounts the upper jaw quarters 4a, 6a, and a lower rotation axis 8b which pivotally mounts the lower jaw quarters 4b, 6b.

The first jaw quarters 4a, 4b each have a rear end 10a, 10b which form an inlet geometry 12 for a pressing machine. Likewise, the rear ends 14a, 14b of the second jaw quarters 6a, 6b form an inlet geometry 16 for the pressing machine. A receiving region 22 is formed between the front ends 18a, 18b of the first jaw quarters 4a, 4b and the front ends 20a, 20b of the second jaw quarters 6a, 6b. The receiving region 22 has a receiving region axis 24. The receiving region axis 24 runs substantially parallel to the rotation axes 8a and 8b of the mount 8. As a result, the first jaw quarters 4a, 4b and the second jaw quarters 6a, 6b arranged offset along the receiving region axis can each be pivoted in a plane transversely to the receiving region axis 24 and transversely to the rotation axes 8a, 8b.

The pressing jaw 1 also comprises a pushing unit 26 which has an upper pushing element 26a and a lower pushing element 26b. The upper pushing element 26a of the pushing unit 26 is connected to the first upper jaw quarter 4a by the guide means 28a. The lower pushing element 26b is connected to the first lower jaw quarter 4b by the guide means 28b. The guide means 28a, 28b are configured as guide rails or guide bolts which run substantially parallel to the receiving region axis 24. The pushing elements 26a, 26b can be moved into corresponding receptables 30a, 30b of the first jaw quarters 4a, 4b by the guide means 28a, 28b. In FIG. 1, the pushing unit 26 is shown in the position moved out of the first jaw quarters 4a, 4b.

A coupling 32a is provided between the upper pushing element 26a of the pushing unit 26 and the second upper jaw quarter 6a, while a coupling 32b is provided between the lower pushing element 26b of the pushing unit 26 and the second lower jaw quarter 6b. In the illustrated embodiment, the couplings 32a, 32b are realised in each case as mutually adapted contact surfaces 34a, 34b, 36a, 36b on the pushing elements 26a, 26b of the pushing unit 26 and on the second jaw quarters 6a, 6b. In this respect, the contact surface 34a arranged on the upper pushing element 26a is in contact with the contact surface 36a of the second upper jaw quarter 6a, while the contact surface 34b arranged on the lower pushing element 26b is in contact with the contact surface 36b of the second upper jaw quarter 6b. Due to the couplings 32a, 32b, the displacement of the pushing unit 26, substantially parallel to the receiving region axis 24, is partly coupled with the closing movement of the second jaw quarters 6a, 6b substantially transversely to the receiving region axis 24, as will become apparent from the further figures.

The receiving region 22 is substantially divided in two. The inner contour 38 of the first jaw quarters 4a, 4b which delimits the receiving region 22 and is provided with a clamping profile forms a first sub-region in which a workpiece, in particular a fitting base body can be clamped or fixed, in the direction of the receiving region axis. In the second sub-region of the receiving region 22, which second sub-region is delimited by the pushing elements 26a, 26b of the pushing unit 26, a workpiece, in particular a press sleeve can be moved by the pushing unit 26 parallel to the receiving region axis 24 or workpiece axis. The pushing unit 26 has a suitably adapted inner contour 40 for this purpose.

Figure 2:
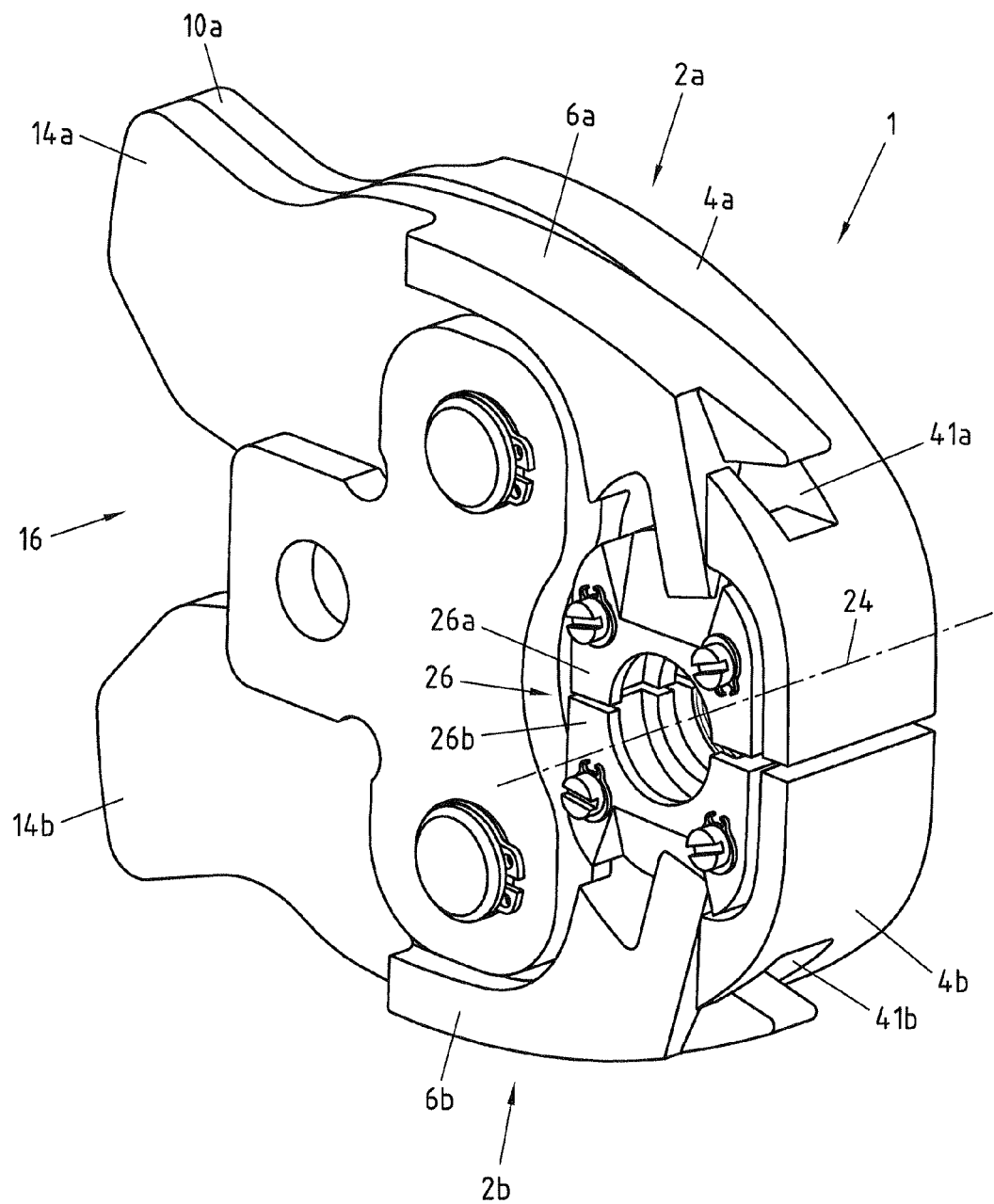
FIG. 2 shows the pressing jaw from FIG. 1 with partly closed first jaw quarters.

FIG. 2 shows the pressing jaw 1 from FIG. 1 with partly closed first jaw quarters 2a, 2b. In this state, the pressing jaw 1 can be applied in particular to one or more workpieces without a clamping and/or pressing procedure having started. By pushing apart the rear ends 10a, 10b, forming the inlet geometry 12, of the first jaw quarters 4a, 4b, the first jaw quarters 4a, 4b are almost completely closed. In this respect, the inlet geometry 16 of the second jaw quarters 6a, 6b is configured similarly to the inlet geometry 12 of the first jaw quarters 4a, 4b in the vicinity of the rear ends 14a, 14b of the second jaw quarters 6a, 6b. Consequently, the second jaw quarters 6a, 6b are also closed initially parallel to the first jaw quarters 4a, 4b. The second upper jaw quarter 6a and the first upper jaw quarter 4a have thereby not moved relative to one another. The same applies to the lower jaw quarters 4b, 6b. This can also be recognised, inter alia, from the fact that, as shown in FIG. 1, the second jaw quarters 6a, 6b have still not engaged in the provided recesses 41a, 41b in the first jaw quarters 4a, 4b.

Due to the movement of the first jaw quarters 4a, 4b substantially transversely to the receiving region axis 24, the pushing elements 26a, 26b have also been moved accordingly substantially transversely to the receiving region axis 24. In this respect, the second upper jaw quarter 6a and the upper pushing element 26a also have the same position relative to one another. The same applies accordingly to the second lower jaw quarter 6b and the lower pushing element 26b. Thus, the pushing unit 26 has not been moved in the direction of the receiving region axis 24.

Figure 3A:
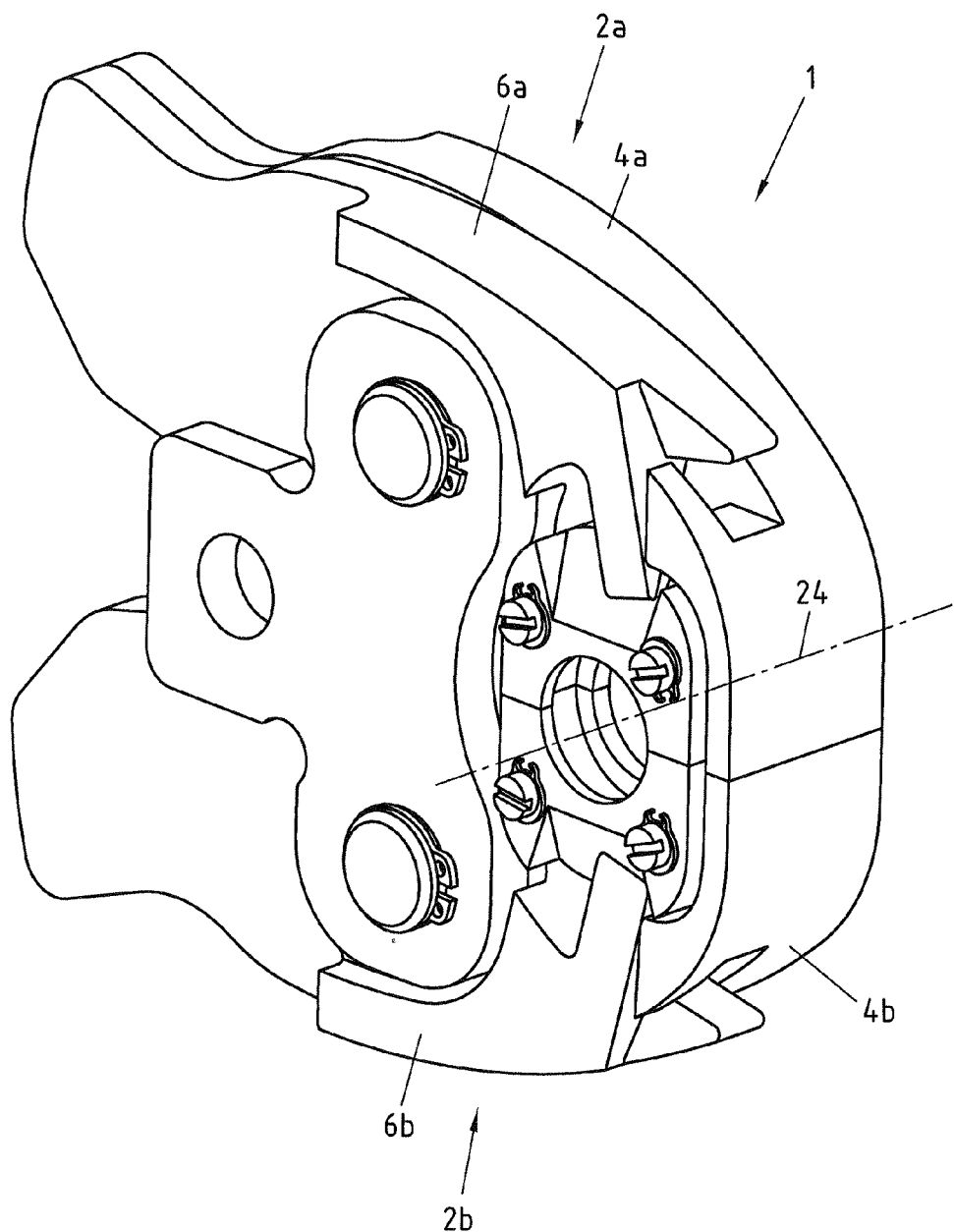

FIG. 3a-c are different views of the pressing jaw 1 from FIG. 2 with closed first jaw quarters 4a, 4b. First of all, FIG. 3a is a perspective view. In contrast to FIG. 2, the first jaw quarters 4a, 4b are now fully closed. The front ends 18a, 18b of the first jaw quarters 4a, 4b as well as the pushing elements 26a, 26b are lying on top of each other. The inner contour 38 of the first jaw quarters 4a, 4b and the inner contour 40 of the pushing unit 26 form a receiving region 22 which is closed in the circumferential direction.

The side view depicted in FIG. 3b shows that the receiving region 24 has a substantially circular cross section. However, elliptical or polygonal cross sections, for example, are also possible.

The inlet geometry 16 of the second jaw quarters 6a, 6b tapers in the direction of the front end 20a, 20b of the second jaw quarters 6a, 6b more narrowly compared to the inlet geometry 12 of the first jaw quarters 4a, 4b. Due to the different inlet geometries 12, 16, a pressing machine can close the second jaw quarters 6a, 6b in a time-delayed manner with respect to the first jaw quarters 4a, 4b.

FIG. 3c shows a cross section along line IIIc from FIG. 3b through the front ends 18a, 18b, 20a, 20b of the jaw quarters 4a, 4b, 6a, 6b in the region of the receiving region 22. The second jaw quarters 6a, 6b are opened further than the first jaw quarters 4a, 4b which are already fully closed. Compared to FIG. 1, the pushing elements 26a, 26b have not yet been moved parallel to the receiving region axis 24. The pushing unit 26 is at a distance from the first jaw quarters 4a, 4b. The contact surfaces 34a, 34b of the pushing elements 26a and 26b are already in contact with the corresponding contact surfaces 36a and 36b of the second jaw quarters 6a and 6b. The contact surfaces 34a, 34b, 36a, 36b have an angle of approximately 50° to the receiving region axis 24.

Figure 4A:
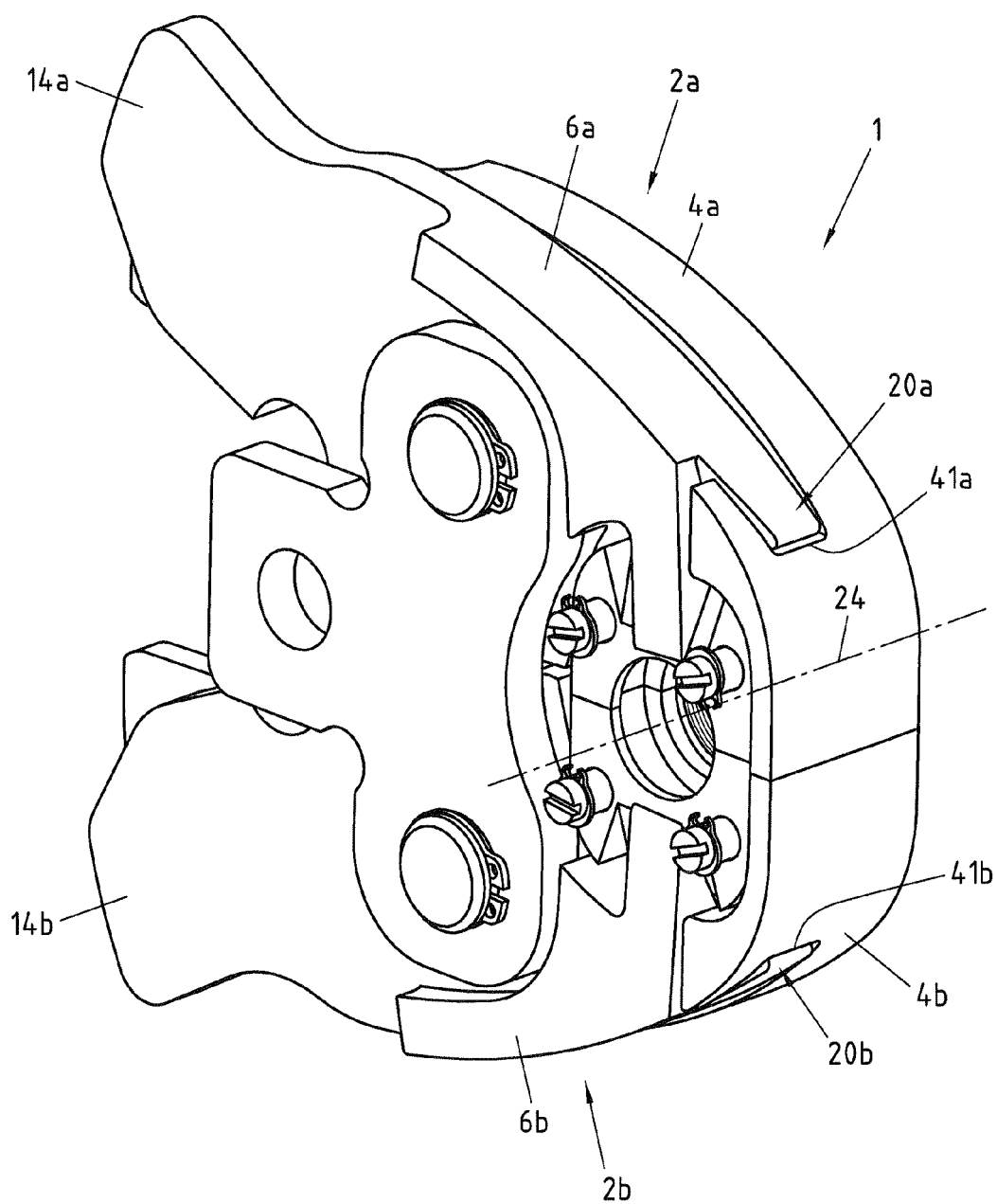

FIG. 4a-c show the pressing jaw 1 from FIG. 3 in a view analogous to FIG. 3, but also with closed second jaw quarters 6a, 6b. FIG. 4a is a perspective view of the pressing jaw 1, while FIG. 4b shows a side view. In contrast to FIG. 3, the second jaw quarters 6a, 6b are now also fully closed due to a further movement transversely to the receiving region axis 24. This can be recognised, inter alia, from the ends 14a, 14b which have now been pushed further apart, of the second jaw quarters 6a, 6b. As a result, the front ends 20a, 20b now engage in the recesses 41a, 41b provided in the first jaw quarters 4a, 4b. Due to the closing movement of the second jaw quarters 6a, 6b substantially transversely to the receiving region axis 24, the second jaw quarters 6a, 6b move relative to the corresponding first jaw quarters 4a, 4b. Consequently, the contact surface 34a of the upper pushing element 26a slides along the contact surface 36a of the second upper jaw quarter 6a and the contact surface 34b of the lower pushing element 26b slides along the contact surface 36b of the second lower jaw quarter 6b. Since the pushing elements 26a, 26b of the pushing unit 26 do not have any freedom of movement transversely to the receiving region axis 24 due to the guide means 28a, 28b, a movement of the pushing elements 26a, 26b parallel to the receiving region axis 24 into the receptables 30a, 30b results from the coupling between the second jaw quarters 6a, 6b and the pushing elements 26a, 26b.

FIG. 4c shows, analogously to FIG. 3c, a cross section along line IVc from FIG. 4b. In contrast to FIG. 3c, the pushing elements 26a, 26b of the pushing unit 26 are now arrested against the first jaw quarters 4a, 4b, since the pushing elements 26a, 26b have been moved towards the first jaw quarters 4a, 4b along the guide means 28a, 28b by the closing movement of the second jaw quarters 6a, 6b transversely to the receiving region axis.

Figure 5:
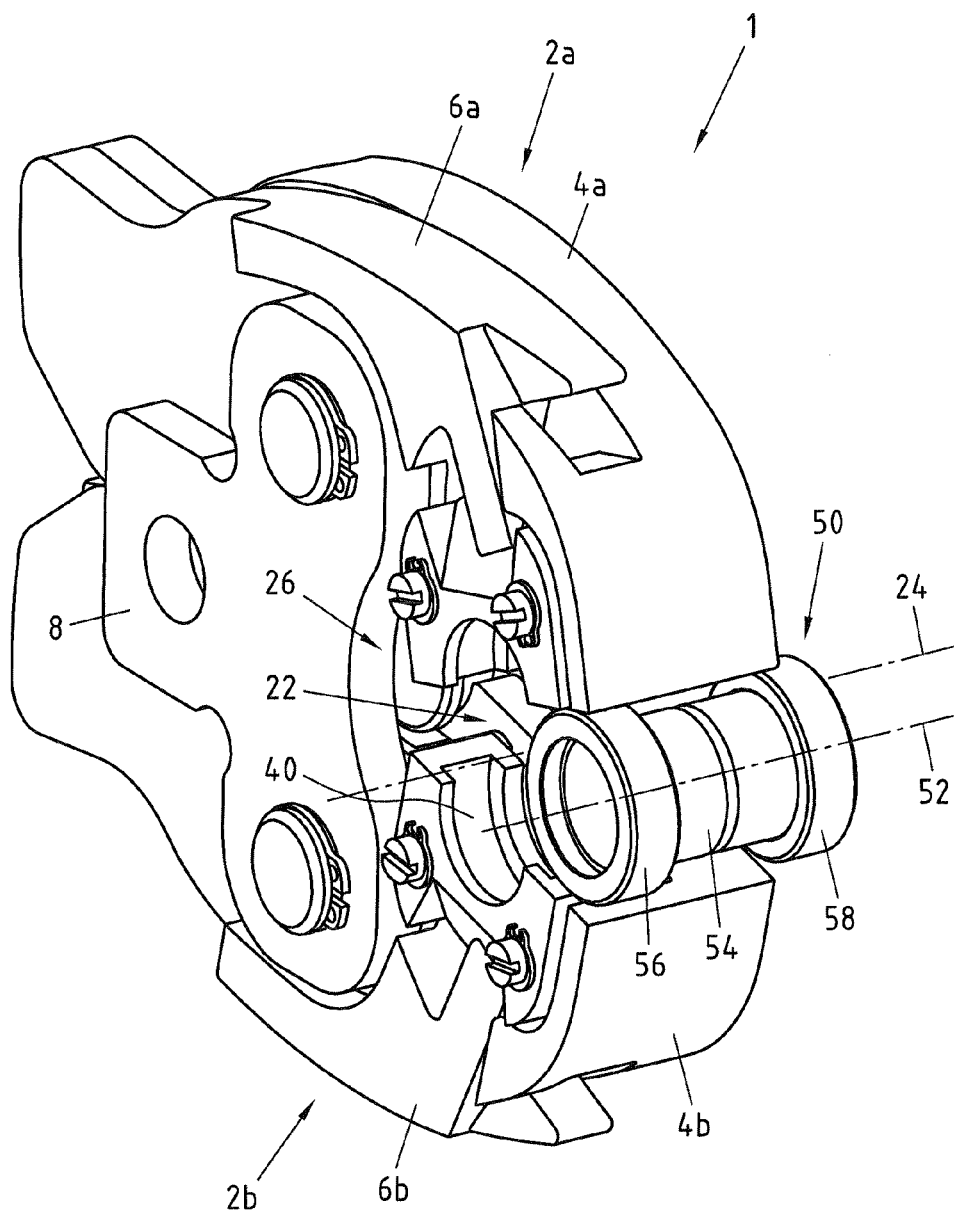
FIG. 5 is a perspective view of the pressing jaw from FIG. 1 with open jaw halves, also with a fitting.

FIG. 5 shows, inter alia, the pressing jaw from FIG. 1. With regard to the description of the pressing jaw 1, reference is made to FIGS. 1 to 4. In contrast to FIG. 1, FIG. 5 also shows a workpiece in the form of a fitting 50. The fitting 50 comprises a fitting base body 54 and two press sleeves 56 and 58 attached to the fitting base body. The fitting 50 is substantially tubular. In the open position of the jaw halves 2a, 2b, the fitting 50 having the axis 52 can be introduced into the receiving region 22 transversely to the receiving region axis 24.

Analogously to FIG. 3a-c, FIG. 6a-c are different views of the pressing jaw 1 and of the fitting 50 from FIG. 5 with closed first jaw quarters 4a, 4b. When the first jaw quarters 4a, 4b are closed, the axis 52 of the fitting 50 coincides with the receiving region axis 24. The inner contour 38 of the first jaw quarters 4a, 4b is adapted to the outer peripheral surface of the base body 54 of the fitting 50. Therefore, in the closed position of the first jaw quarters 4a, 4b, the inner contour 38 clamps the base body 54. In this respect, the fitting base body 54 can also be pressed transversely to the workpiece axis 52. However, only a clamping action preferably takes place, so that the fitting base body 54 is secured relative to the pressing jaw 1 against movements in the direction of the workpiece axis 52 or in the direction of the receiving region axis 24.

Figure 6A:
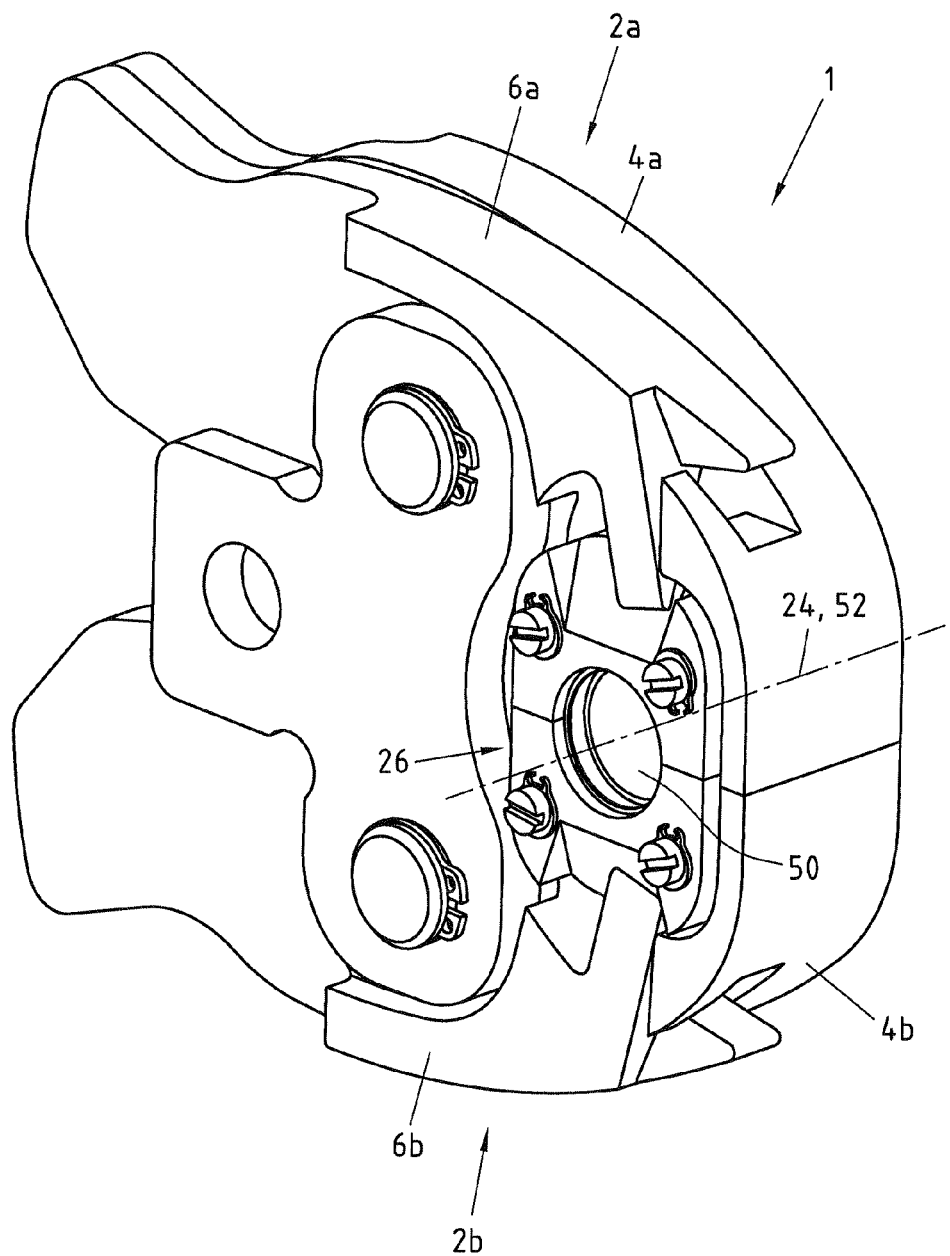

In the position of the pushing element 26 shown in FIG. 6a-c, the pushing unit 26 engages behind the press sleeve 56. The pushing unit 26 is adapted by radial inward projections 44a, 44b of the upper and lower pushing elements 26a and 26b on the inner contour 40 of the pushing unit 26, which projections 44a, 44b engage behind the press sleeve 56.

If the second jaw quarters 6a, 6b are now moved into their closed position transversely to the receiving region axis 24, due to the coupling 32a, 32b the pushing unit 26 is moved substantially parallel to the receiving region axis 24, as a result of which the press sleeve 56 is pushed onto the fitting base body in the direction of the axis 52 of the fitting 50. As a result, for example a pipe (not shown) inserted into the fitting 50 can be pressed with the fitting 50.

Figure 7A:
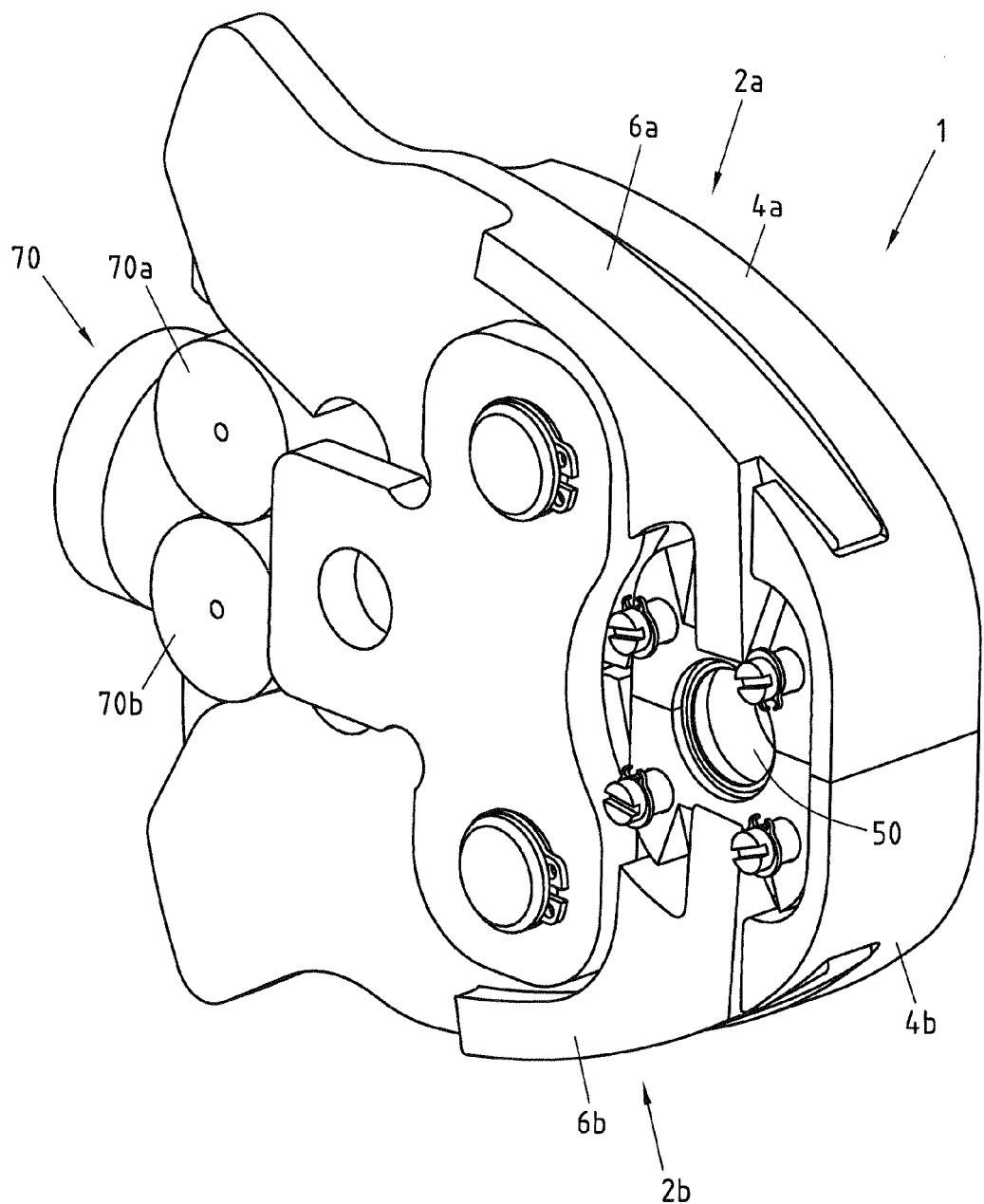
Figure 8:
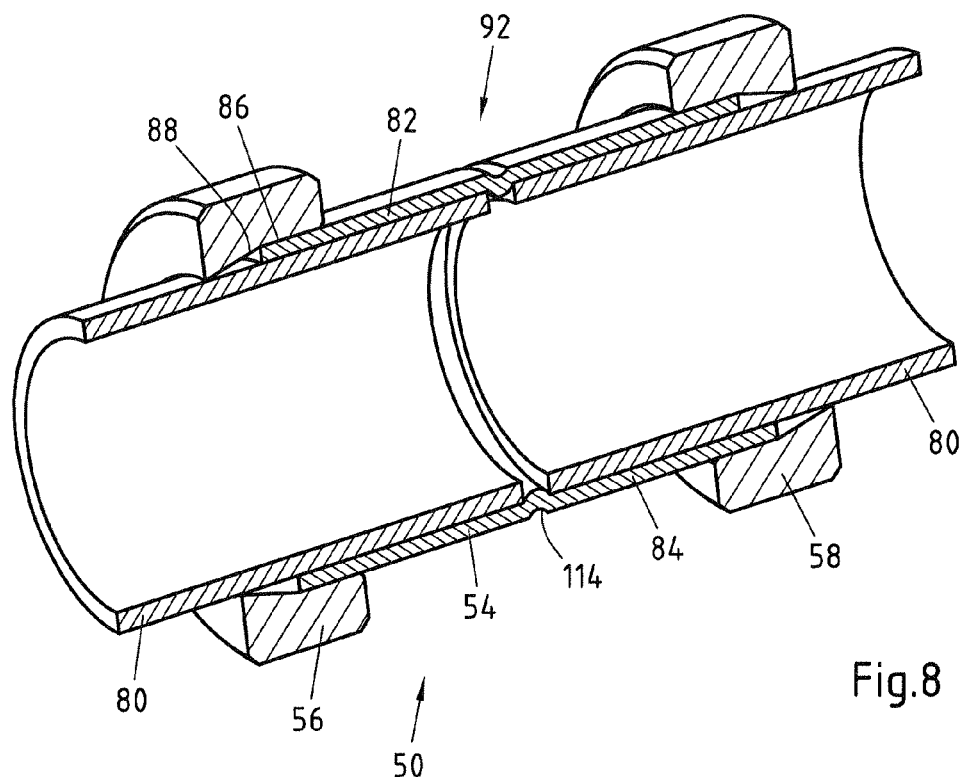
FIG. 8 is a perspective view of a first embodiment of a fitting according to the invention before pressing.
Figure 9:
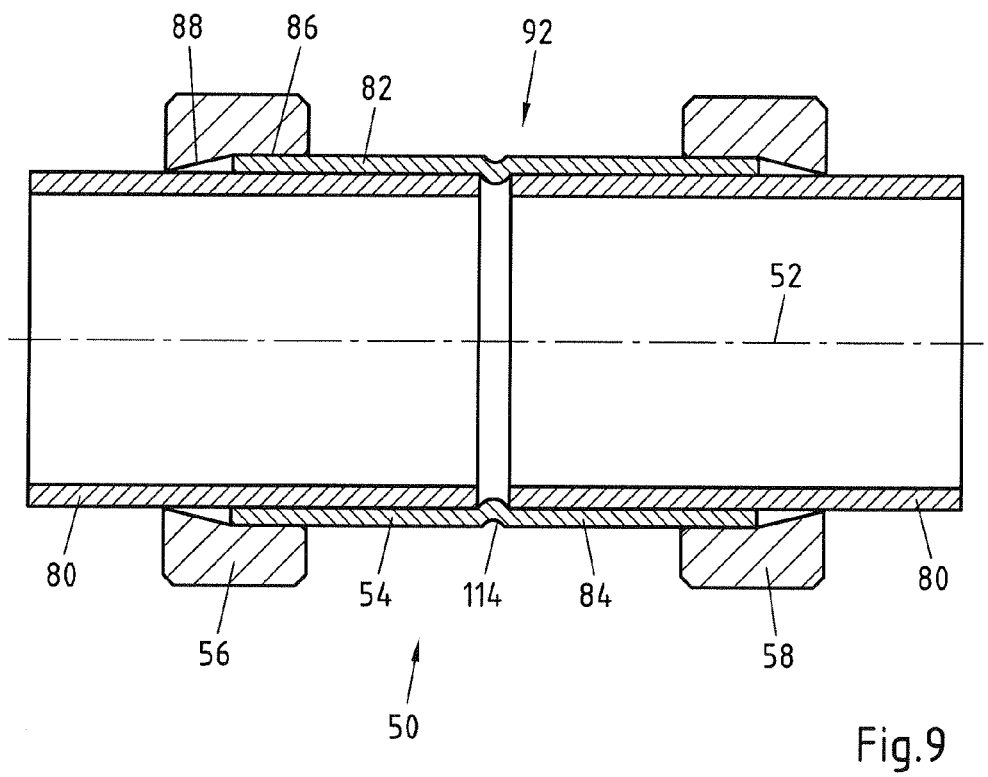
FIG. 9 is a cross-sectional view of the fitting from FIG. 8.

This state is shown in FIG. 7a-c which are different views of the pressing jaw 1 with fitting 50 from FIG. 6 with closed second jaw quarters 6a, 6b, analogously to FIG. 4a-c.

The press sleeve 58 which, as can be seen in FIG. 7c, is still only positioned can then be pushed onto the fitting base body 54 by the pressing jaw 1 in the same manner as the press sleeve 56 by introducing the fitting 50, rotating it by 180°, into the receiving region 22.

FIGS. 7a and 7b also show a pressing machine 70. By introducing the rollers 70a, 70b between the rear ends 10a, 10b and 14a, 14b which form the inlet geometries 12, 16, the pressing jaw is gradually closed. In the position of the pressing jaw 1 shown in FIG. 7, the pressing jaw is already completely closed, i.e. the rollers 70a, 70b of the pressing machine 70 have moved in to such an extent that the first jaw quarters 4a, 4b as well as the second jaw quarters 6a, 6b are fully closed.

Thereafter, all the jaw quarters 4a, 4b; 6a, 6b can be opened together, for example by hand and the pressing jaw 1 can be removed from the pressed fitting 50 which can produce a non-detachable pipe joint.

Fittings according to the invention will be described in more detail in the following with reference to FIGS. 8 to 18.

FIGS. 8 to 11 illustrate a first embodiment of a fitting 50 according to the invention, in a perspective view and in a cross-sectional view in each case.

The fitting 50 is provided for a metallically sealing joint with at least one metallic pipe 80. A metallic fitting base body 54 has a cylindrical socket 82 with an internal diameter which is adapted to the external diameter of the pipe 80 to be joined. The illustrated end of the pipe 80 can thereby be inserted into the socket 82 in order to then be joined to the fitting base body 54.

Furthermore, a press sleeve 56 in the form of a press ring is provided at the end shown to the left-hand side of the fitting base body 54. Provided at the other end of the fitting base body 54 is also a socket 84 which cooperates in the same way with the press sleeve 58 and the pipe 80 as the socket 82 cooperates with the press sleeve 56 and the pipe 80. For this reason, only socket 82 and the mode of operation thereof will be described in the following.

At one end, the press sleeve 56 has a receiving portion 86 for receiving an end part of the socket 82. The press sleeve 56 can thereby be partly pushed onto the socket 82 in order to achieve a satisfactory retention at the same time as accurately positioning the press sleeve 56 relative to the socket 82. In the starting position shown in FIGS. 8 and 9, the fitting base body 54 has thus been partly inserted into the press sleeve 56. In this respect, it is preferred that the inner contour of the receiving portion 86 produces a self-retention when the press sleeve 56 has been positioned on the socket 82. For this purpose, the internal diameter can be selected such that a light press fit with the socket 82 is produced. Likewise, the inner contour of the receiving portion 86 can be provided with a roughened surface to produce the self-retention effect.

Furthermore, the press sleeve 56 has a pressing portion 88, the inner profile of which tapers in the axial direction to a diameter smaller than the external diameter of the fitting base body 54. The inner profile of the pressing portion 88 is thus capable of tapering the edge of the socket 82 to an internal diameter which is smaller than the external diameter of the pipe 80 to be joined, during an axial displacement onto the fitting base body 54.

Figure 10:
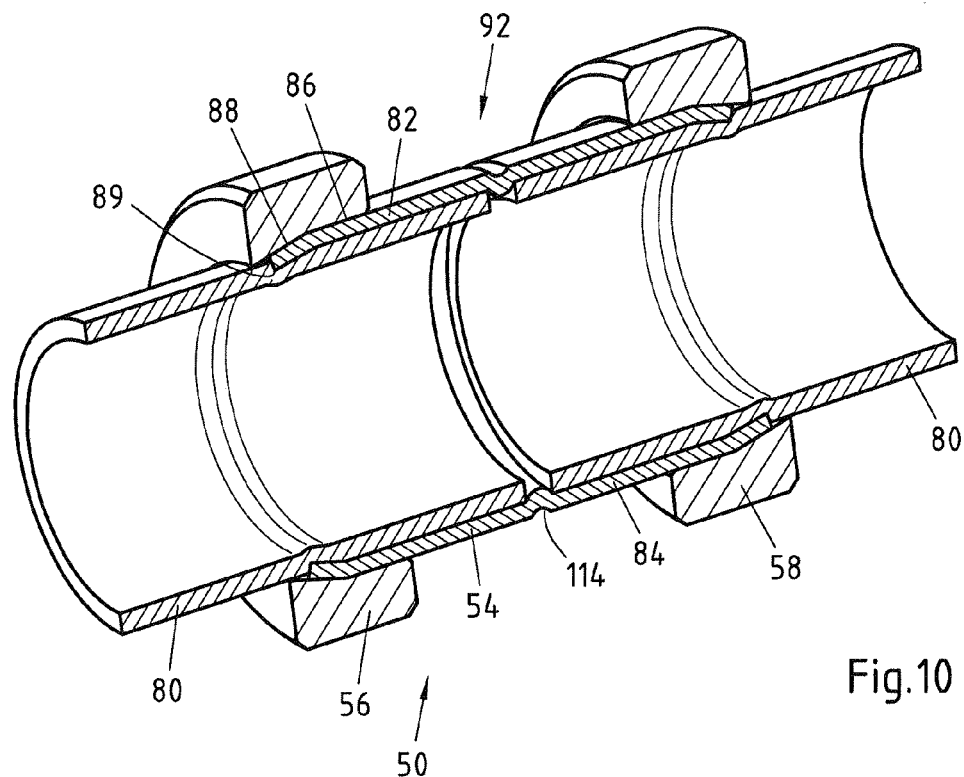
FIG. 10 is a perspective view of the first embodiment of a fitting according to the invention after pressing.
Figure 11:
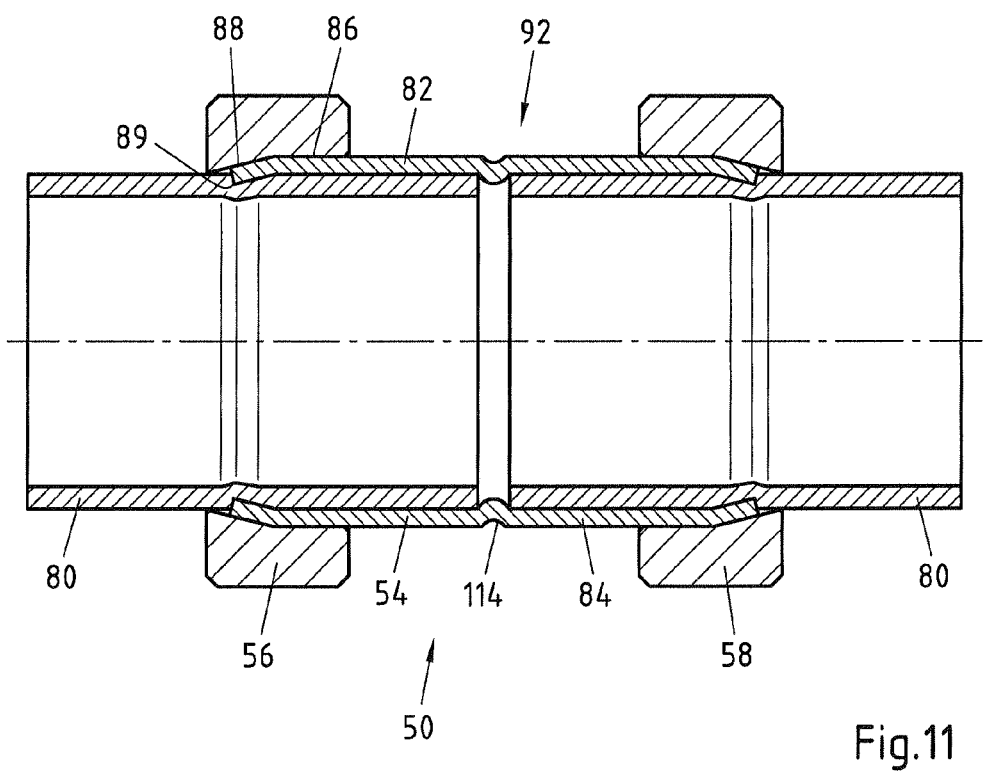
FIG. 11 is a cross-sectional view of the fitting from FIG. 10.

This state is shown in FIGS. 10 and 11. The socket 82, inserted into the press sleeve 56, of the fitting base body 56 is formed or flanged radially inwards so that the edge of the socket 82 cuts into the material of the pipe 80. Formed thereby over the entire circumference of the socket 82 is a cutting edge 89 in the form of a sealing flange which produces a metallically sealing joint between fitting base body 54 and pipe 80.

The straight edge of the cylindrical fitting 50 or of the cylindrical socket 82 is thus reshaped into a circumferential cutting edge 89 by the pressing procedure.

The previously described mode of operation of the fitting base body 54, shown on the left-hand side, with socket 82 in cooperation with the press sleeve 36 and the pipe 80 applies likewise to the socket 84, press sleeve 58 and pipe 80, shown on the right-hand side.

Figure 12:
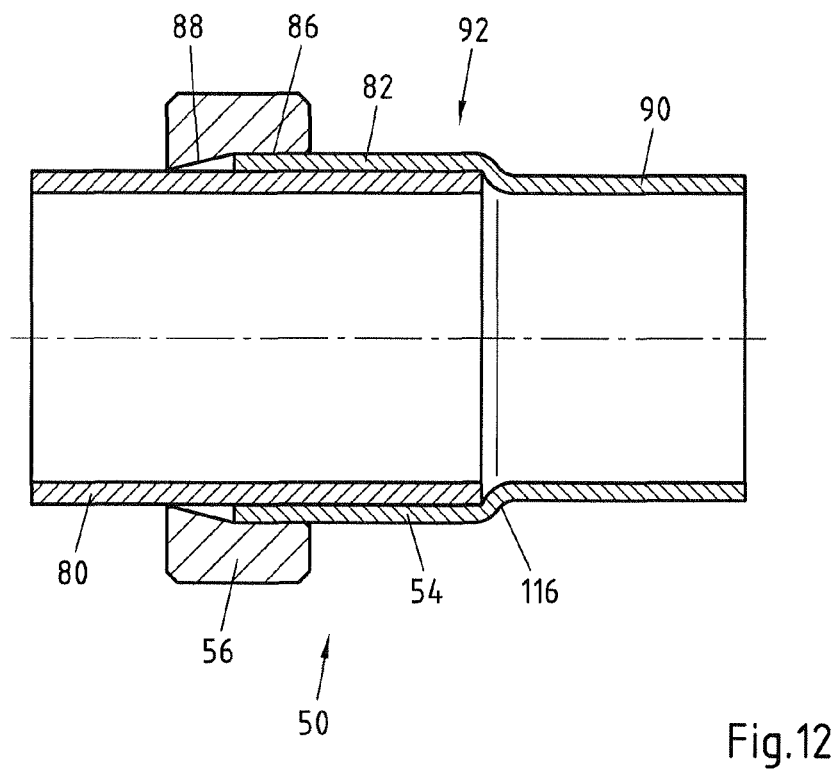
FIG. 12 is a cross-sectional view of a second embodiment of a fitting according to the invention before pressing.
Figure 13:
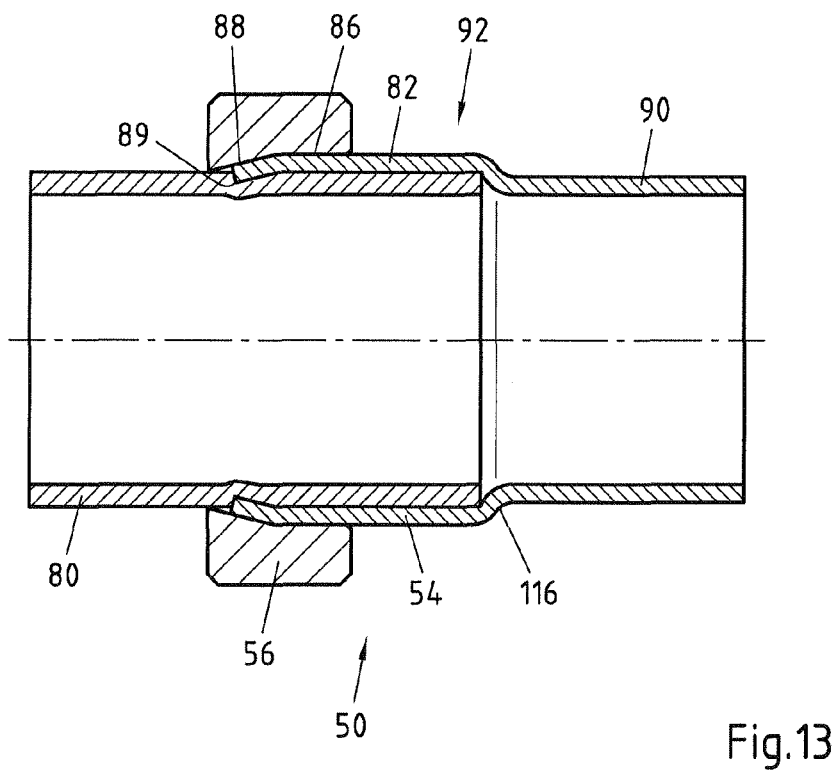
FIG. 13 is a cross-sectional view of the fitting from FIG. 12 after pressing.

FIG. 12 (not pressed) and FIG. 13 (pressed) show a second embodiment of a fitting 50 according to the invention, in which the fitting base body 54 is only provided at one end with a socket 54 and a press sleeve 56, whereas the end shown on the right-hand side is configured as an insertion end 90. In this respect, the shape of the fitting base body is illustrated as being straight. In addition, curved arcs, T pieces or armatures are also possible as the fitting base body.

As shown in FIGS. 8 to 13, the receiving portion 86 is cylindrical. Therefore, the socket 82 can be positioned accurately due to the axial guidance of the receiving portion 86, thereby allowing a good, uniform pressing result to be obtained.

Furthermore, the pressing portion 88 is conical, as also shown in FIGS. 8 to 11. As a result, a uniform reshaping of the end of the socket 82 is achieved. A circumferential edge 87 then runs between the receiving portion 86 and the pressing portion 88.

FIG. 14 shows a plurality of possible inner contours of the press sleeve 56, the receiving portion 86 and the pressing portion 88 having different contours.

Figure 14A:
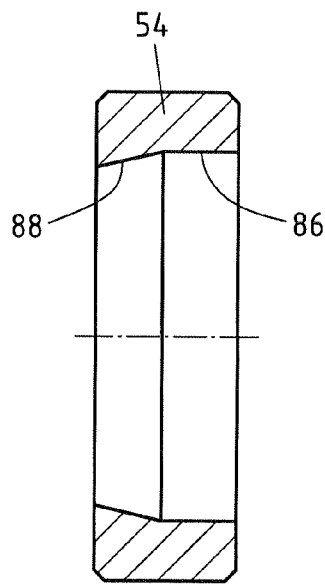
FIG. 14a-d show different configurations of the inner profile of a press sleeve according to the invention.

FIG. 14*a* shows the inner contour from FIGS. 8 to 13, where the receiving portion 86 is cylindrical and the pressing portion 88 is conical.

Figure 14B:
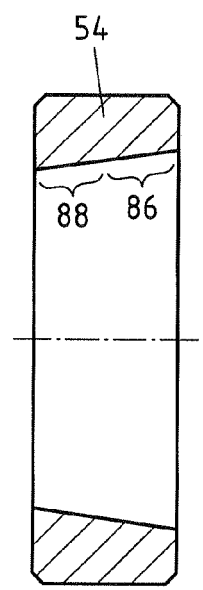

FIG. 14*b* shows an inner contour with an overall conical path with the same gradient for the receiving portion 86 and for the pressing portion 88, so that these two portions cannot be directly differentiated from one another. Therefore, in a uniformly deflecting inner contour, a first portion is designated as the receiving portion 86 and the adjoining portion is designated as the pressing portion 88, the respective portions assuming the respective functions. The flat gradient makes it possible for the receiving portion 86 to receive the socket (not shown here) in a self-retaining manner, so that the press sleeve 54 can be pre-installed on the fitting base body (not shown here).

Figure 14C:
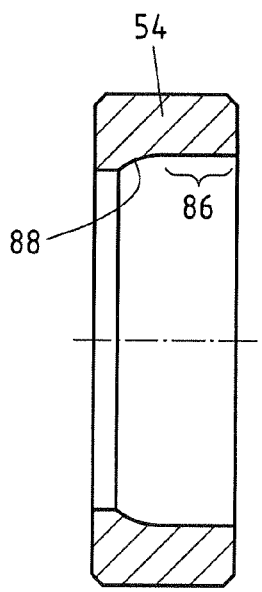

In FIG. 14*c*, the receiving portion 86 is again cylindrical, whereas the pressing portion 88 is round or bulging. The distinction between round and bulging depends on which radial path is selected for the curved inner contour of the pressing portion 88.

Figure 14D:
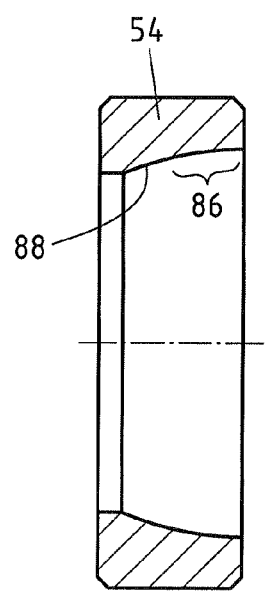

Finally, FIG. 14*d* shows a press sleeve 54, in which both the receiving portion 86 and the pressing portion 88 have a curved inner contour in the axial direction. An inserted socket is thereby initially guided into the press sleeve being progressively inserted, and is then increasingly shaped inwards.

In the illustrated embodiments, the conical surfaces are shown at an angle to the axial direction. In this respect, the preferred angular range is from 1 to 30°, in particular from 10 to 20°.

The fitting shown in FIGS. 8 to 13 is suitable for axial pressing using a pressing jaw according to the invention which has been described in connection with FIGS. 1 to 7. The pressing procedure can be seen particularly in FIGS. 5, 6*c* and 7*c*.

For this purpose, the fitting base body 54 has a clamping portion 92 for clamping by means of a first jaw pair 4*a*, 4*b* of the pressing jaw described above. The clamping portion 92 adjoins the portion of the fitting base body 54 which has been inserted into the press sleeve 56.

Clamping by means of the jaw pair 4*a*, 4*b* axially fixes the fitting base body 54 together with the pipe 80 so that it is subsequently possible to push the press sleeve 56 onto the fitting base body 54. For this reason, first of all the fitting base body 54 is fixed and only then is the press sleeve 56 pressed on axially.

The pressing jaws 4*a*, 4*b* can also produce a partial pressing of the clamping portion 92, i.e. a partially permanent forming of a structure into the fitting base body 54. In this respect, pressing can be carried out rotationally symmetrically or also in the form of a polygon, in particular a hexagon to prevent the pipe 80 from twisting relative to the fitting base body 54. Although the pressing in the region of the clamping portion 92 increases the mechanical strength of the joint, it does not replace the axial pressing of the press sleeve 56 onto the fitting base body 54.

As already mentioned, the pressing procedure of the described fitting 50 is not restricted to the use of the pressing jaws according to the invention. Any other form of axial pressing can be used for the fitting 50 according to the invention.

An example of this is shown in FIGS. 15 to 18 as a third embodiment, where the same reference numerals are used for the same elements of the fitting 50 as before. For this reason, reference is made only to the differences compared to the previously described embodiments.

The third embodiment is capable of being pressed axially by a pressing jaw, as described in DE 10 2008 010 083 A1.

The press sleeve 56 which has been pushed onto the fitting base body 54 in the starting position has an obliquely deflecting bearing surface 94. Furthermore, the fitting base body 54 has a clamping ring 98, arranged in a circumferential depression 96, with a bearing surface 100, the alignment of which runs in an opposite direction to the bearing surface 94. The clamping ring 98 is at least partly flexible so that it can be positioned on the metal fitting base body 54. Nevertheless, the clamping ring 98 is sufficiently resistant to be able to provide the function of an abutment for the axial pressing forces, as is described in the following.

Figure 16:
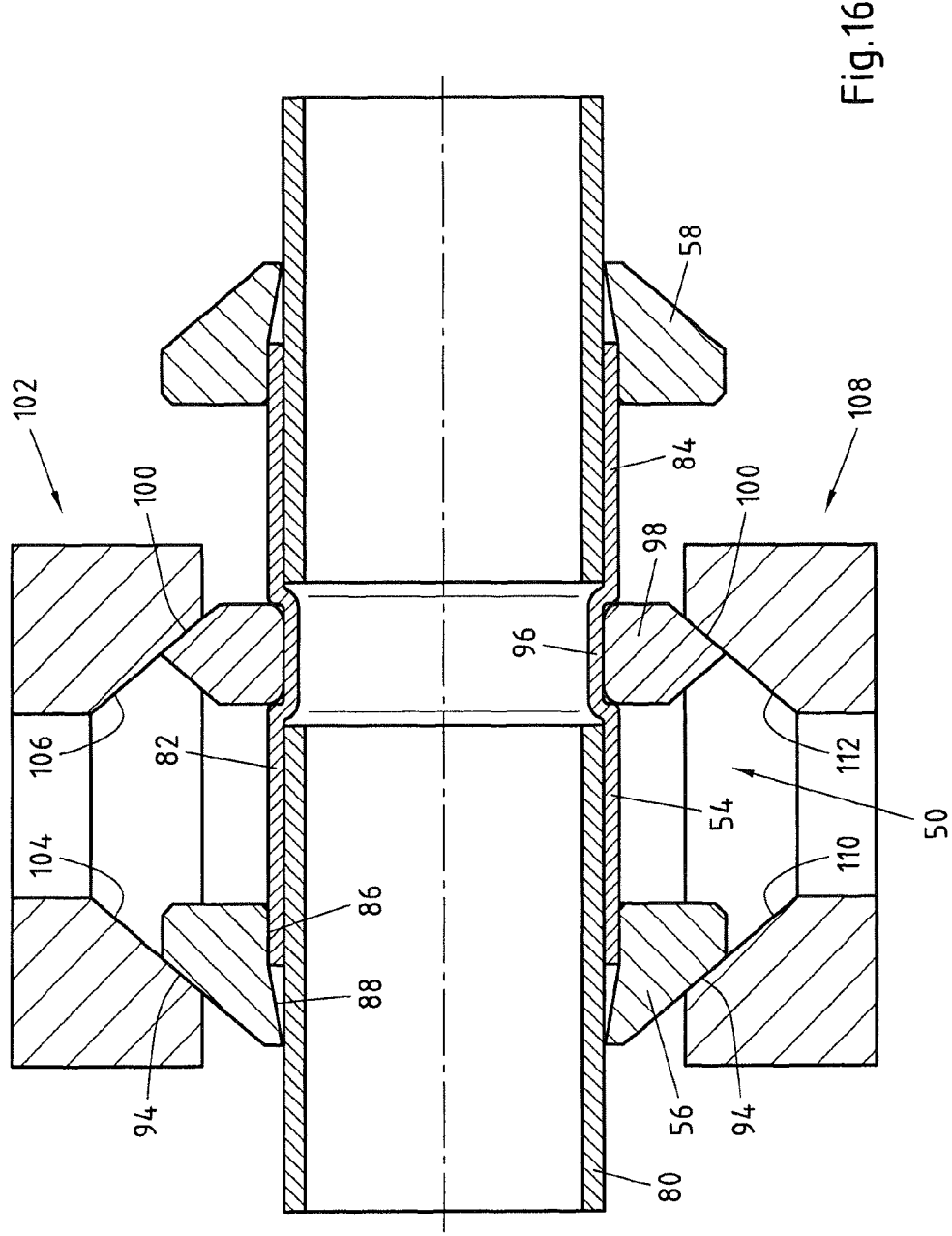
FIG. 16 is a cross-sectional view of the fitting from FIG. 14 with applied pressing jaw.

FIG. 16 shows, in addition to a fitting 50, a pressing jaw 102 which has two bearing surfaces 104 and 106 which are aligned in opposite directions to one another. Bearing surface 104 cooperates with bearing surface 94 of the press sleeve 56, whereas bearing surface 106 rests against bearing surface 100 of the clamping ring 98.

An identically configured pressing jaw 108 with bearing surfaces 110 and 112 rests on the opposite side of the press sleeve 56 and, in this case, bearing surface 110 interacts with bearing surface 94 of the press sleeve 56 and bearing surface 112 interacts with bearing surface 100 of the clamping ring 98.

Figure 17:
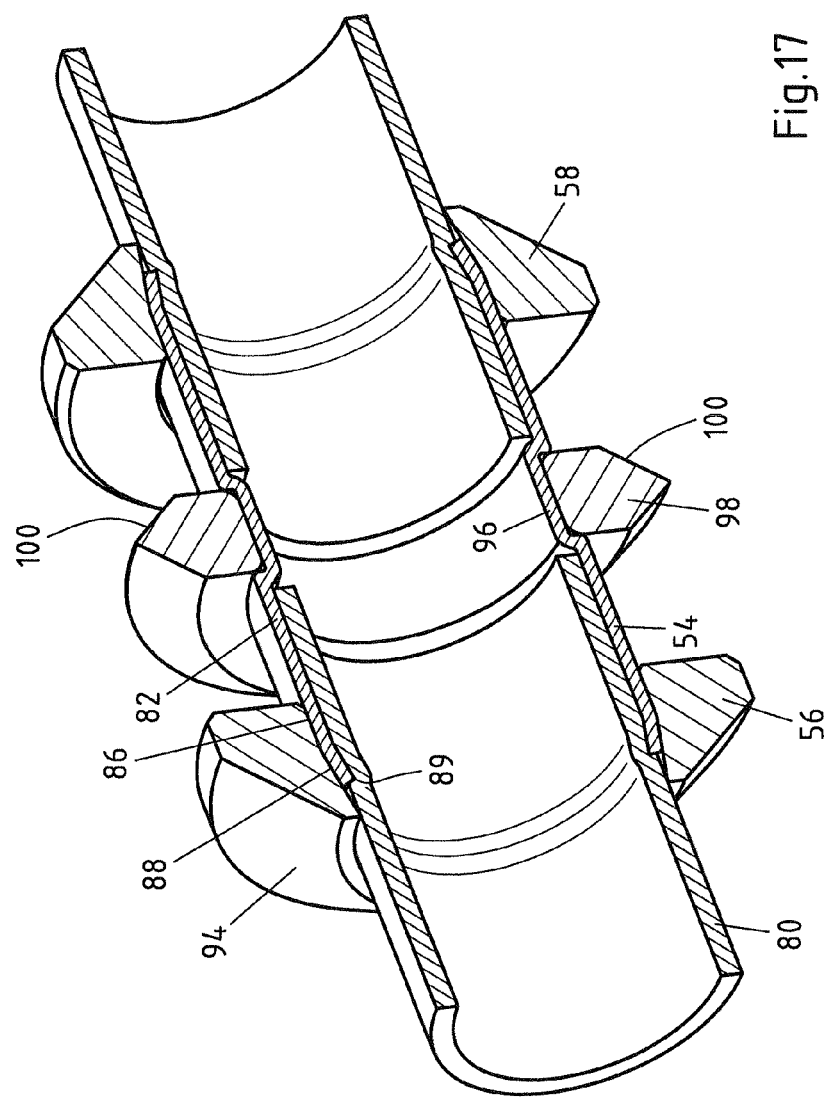
FIG. 17 is a perspective view of the third embodiment of a fitting according to the invention after pressing.
Figure 18:
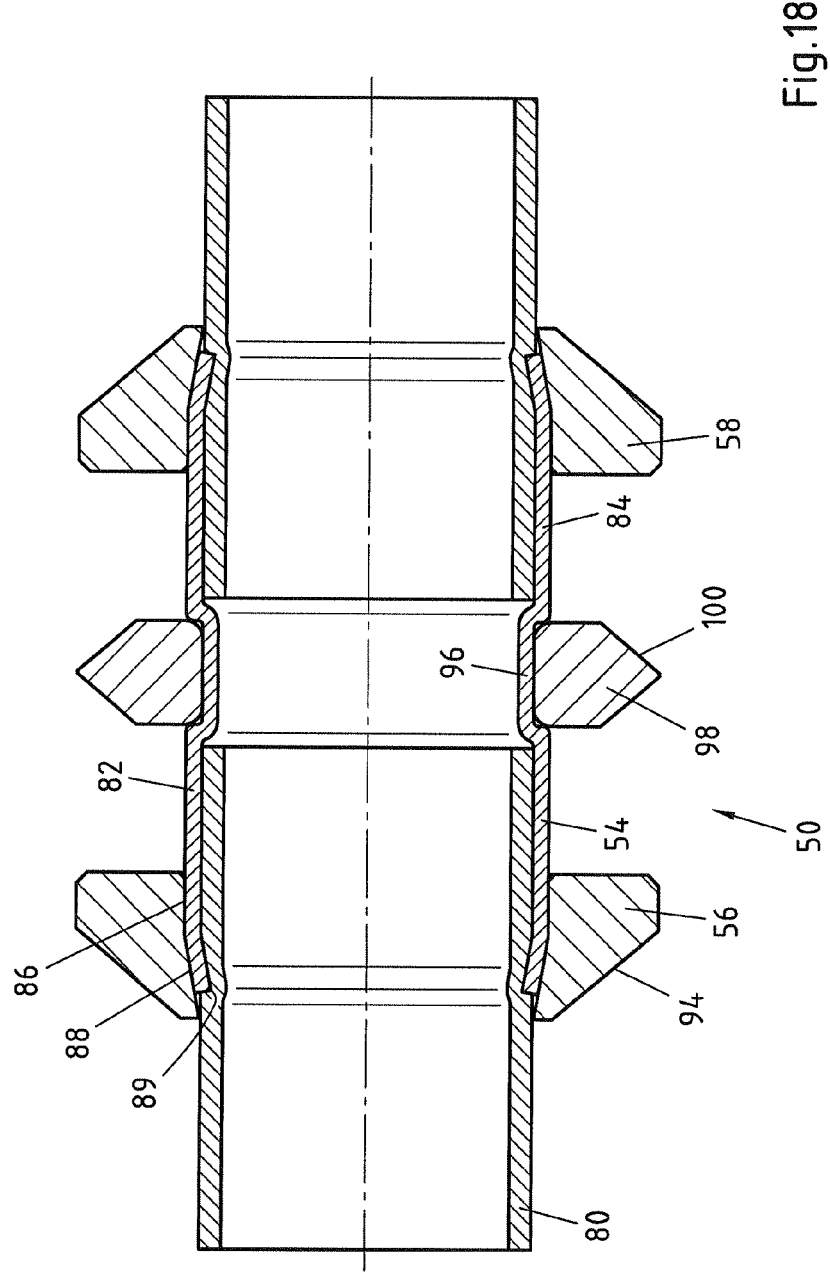
FIG. 18 is a cross-sectional view of the fitting from FIG. 16.

During pressing, the two pressing jaws 102 and 108 are moved towards one another and the oblique bearing surfaces slide along one another, as a result of which the press sleeve 56 is pressed onto the fitting base body 54. In this respect, the clamping ring 98 acts as an abutment. FIGS. 17 and 18 show the pressed state of the press sleeve 56.

FIGS. 15 to 18 show a respective second press sleeve 58, as in FIGS. 8 to 11. The press sleeve 58 also has an obliquely deflecting bearing surface and the clamping ring 98 also has a bearing surface corresponding thereto. Therefore, the press sleeve 98 can also be axially pressed by means of the clamping ring 98 and the described pressing jaws 102 and 108 when they have been applied accordingly.

The fitting base bodies 54, shown in FIGS. 8 to 13 and 15 to 18 can be configured as a solder fitting, for example. These fittings which are economical to produce can therefore be easily axially pressed in a metallically sealing manner by the present invention.

Finally, in the illustrated embodiments, a stop for the pipe 80 to be inserted is formed in the fitting base body 54 by a circumferential depression 114, by a shoulder 116 or by the depression 96 for the clamping ring 98.

The invention claimed is:

1. A pressing jaw for producing a non-detachable pipe joint, having an upper jaw half and a lower jaw half, at least one rotation axis which pivotally mounts at least one jaw half, a receiving region formed between the upper jaw half and the lower jaw half, and having a receiving region axis, whereby at least one jaw half is able to pivot between an open position and a closed position substantially transversely to the receiving region axis, wherein at least one pushing unit is provided, said pushing unit transforming a pivotal movement of the at least one jaw half performed substantially transversely to the receiving region axis into a displacement at least partly parallel to the receiving region axis.

2. The pressing jaw according to claim 1, wherein the upper jaw half has a first upper jaw quarter and a second upper jaw quarter, that the lower jaw half has a first lower jaw quarter and a second lower jaw quarter, and that the first jaw quarters can be closed at least partly independently of the second jaw quarters.

3. The pressing jaw according to claim 2, wherein a coupling is provided between the pushing unit and at least one second jaw quarter such that the displacement of the pushing unit at least partly parallel to the receiving region axis is at least partly coupled with a closing movement of the at least one second jaw quarter substantially transversely to the receiving region axis.

4. The pressing jaw according to claim 3, wherein the coupling is realised by contact surfaces which are provided on the pushing unit and on at least one second jaw quarter, are adapted to one another and are inclined relative to the receiving region axis.

5. The pressing jaw according to claim 4, wherein the contact surfaces are inclined relative to the receiving region axis by at least 30° or by a maximum of 80°.

6. The pressing jaw according to claim 2, wherein the second jaw quarters are arranged offset relative to the first jaw quarters along the receiving region axis.

7. The pressing jaw according to claim 2, wherein the first jaw quarters are positioned substantially in a first plane substantially transversely to the receiving region axis and that the second jaw quarters are positioned substantially in a second plane substantially transversely to the receiving region axis.

8. The pressing jaw according to claim 2, wherein, the first jaw quarters are configured as clamping jaws.

9. The pressing jaw according to claim 2, wherein the first jaw quarters have a first inlet geometry, that the second jaw quarters have a second inlet geometry, the first inlet geometry and the second inlet geometry being configured differently.

10. The pressing jaw according to claim 2, wherein guide means are provided between the pushing unit and at least one first jaw quarter so that the movement of the pushing unit substantially transversely to the receiving region axis is coupled with a movement of the corresponding at least one first jaw quarter.

11. The pressing jaw according to claim wherein the pushing unit has an upper pushing element and a lower pushing element.

12. A system, comprising:
a pressing jaw for producing a non-detachable pipe joint, having an upper jaw half and a lower jaw half, at least one rotation axis which pivotally mounts at least one jaw half, a receiving region formed between the upper jaw half and the lower jaw half, and having a receiving region axis, whereby at least one jaw half is able to pivot between an open position and a closed position substantially transversely to the receiving region axis, wherein at least one pushing unit is provided, said pushing unit transforming a pivotal movement of the at least one jaw half performed substantially transversely to the receiving region axis into a displacement at least partly parallel to the receiving region axis; and a fitting having a base body and a press sleeve, wherein the receiving region of the pressing jaw is adapted to the fitting base body, and wherein the pushing unit of the pressing jaw is adapted to the press sleeve so that the press sleeve can be at least partly pushed onto the fitting base body by the pivotal movement.

13. A method for producing a non-detachable pipe joint using a pressing jaw for producing a non-detachable pipe joint, having an upper jaw half and a lower jaw half, at least one rotation axis which pivotally mounts at least one jaw half, a receiving region formed between the upper jaw half and the lower jaw half, and having a receiving region axis, whereby at least one jaw half is able to pivot between an open position and a closed position substantially transversely to the receiving region axis, wherein at least one pushing unit is provided, said pushing unit transforming a pivotal movement of the at least one jaw half performed substantially transversely to the receiving region axis into a displacement at least partly parallel to the receiving region axis, wherein a fitting base body located in the receiving region of the pressing jaw is fixed by actuating the pressing jaw, and wherein after the fitting base body has been fixed, a press sleeve is pushed onto the fitting base body by the pivotal movement.

14. The method according to claim 13, wherein a section of pipe is fixed by first upper and lower pressing jaw quarters of the pressing jaw, and wherein the movement of the pushing unit which is at least partly parallel to the receiving region axis is produced by a closing movement of second lower and upper pressing jaw quarters.

15. The method according to claim 14, wherein a metallically sealing joint between the fitting and the section of pipe is produced.

* * * * *

UNITED STATES PATENT AND TRADEMARK OFFICE
CERTIFICATE OF CORRECTION

| | | |
|---|---|---|
| PATENT NO. | : 9,334,987 B2 | Page 1 of 1 |
| APPLICATION NO. | : 14/410452 | |
| DATED | : May 10, 2016 | |
| INVENTOR(S) | : Frank Hofmann | |

It is certified that error appears in the above-identified patent and that said Letters Patent is hereby corrected as shown below:

Claims

Column 19, Line 40, Claim 11, delete "claim" and insert -- claim 1, --

Signed and Sealed this
Twenty-third Day of August, 2016

Michelle K. Lee
*Director of the United States Patent and Trademark Office*